United States Patent
Antó et al.

(10) Patent No.: US 9,462,557 B2
(45) Date of Patent: Oct. 4, 2016

(54) METHOD AND AN APPARATUS IN A USER EQUIPMENT FOR CONTROLLING TRANSMISSION POWER OF THE USER EQUIPMENT

(75) Inventors: Aram Antó, Stockholm (SE); George Jöngren, Sundbyberg (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 116 days.

(21) Appl. No.: 14/237,583

(22) PCT Filed: Feb. 28, 2012

(86) PCT No.: PCT/SE2012/050222
§ 371 (c)(1),
(2), (4) Date: Feb. 7, 2014

(87) PCT Pub. No.: WO2013/025144
PCT Pub. Date: Feb. 21, 2013

(65) Prior Publication Data
US 2014/0219152 A1    Aug. 7, 2014

Related U.S. Application Data

(60) Provisional application No. 61/523,689, filed on Aug. 15, 2011.

(51) Int. Cl.
*G08C 17/00* (2006.01)
*H04W 52/08* (2009.01)
*H04W 52/24* (2009.01)
(Continued)

(52) U.S. Cl.
CPC ........... *H04W 52/08* (2013.01); *H04W 52/244* (2013.01); *H04W 52/245* (2013.01); *H04W 52/325* (2013.01); *H04W 52/40* (2013.01)

(58) Field of Classification Search
None
See application file for complete search history.

(56) References Cited

U.S. PATENT DOCUMENTS

2006/0270385 A1* 11/2006 Morris .......................... 455/405
2006/0286996 A1* 12/2006 Julian et al. .................. 455/522
(Continued)

FOREIGN PATENT DOCUMENTS

WO    2010121635 A1    10/2010
WO    2010124241 A2    10/2010
(Continued)

OTHER PUBLICATIONS

Nec, et al., "Text Proposal for TR36.9xx: Smart Power Control", 3GPP TSG-RAN WG4 Meeting #53, Jeju, Korea, Nov. 9, 2009, pp. 1-10, R4-095020, 3GPP.
(Continued)

*Primary Examiner* — Otis L Thompson, Jr.
(74) *Attorney, Agent, or Firm* — Coats & Bennett, PLLC

(57) ABSTRACT

Disclosed are methods and apparatuses in user equipments (1400) and network nodes (1410, 420) for controlling transmission power of the user equipments when the user equipments are connected to a wireless network. The disclosed methods and apparatuses deals with independently controlling transmission power of SRS signals and signals comprising traffic data from the user equipment (1400). Thereby, it is possible to use different power levels for SRS signals intended to e.g. a macro node and for traffic data intended to e.g. a pico node.

25 Claims, 16 Drawing Sheets

(51) Int. Cl.
*H04W 52/32* (2009.01)
*H04W 52/40* (2009.01)

(56) References Cited

U.S. PATENT DOCUMENTS

| | | | | |
|---|---|---|---|---|
| 2008/0045260 | A1* | 2/2008 | Muharemovic | H04W 52/286 455/522 |
| 2013/0077571 | A1* | 3/2013 | Papasakellariou | H04W 52/325 370/328 |
| 2014/0221038 | A1* | 8/2014 | Nakashima et al. | 455/522 |

FOREIGN PATENT DOCUMENTS

| WO | 2011162661 A1 | 12/2011 |
|---|---|---|
| WO | 2012176154 A1 | 12/2012 |
| WO | 2012177207 A1 | 12/2012 |

OTHER PUBLICATIONS

3rd Generation Partnership Project, 3rd Generation Partnership Project; Technical Specification Group Radio Access Network; Evolved Universal Terrestrial Radio Access (E-UTRA); Physical Layer Procedures (Release 10), 3GPP TS 36.213 V10.2.0, Jun. 1, 2011, pp. 1-120, 3GPP, France.

3rd Generation Partnership Project. "3rd Generation Partnership Project; Technical Specification Group Radio Access Network; Evolved Universal Terrestrial Radio Access (E-UTRA); Multiplexing and channel coding (Release 10)." 3GPP TS 36.212 V10.3.0, Sep. 2011, Sophia Antipolis Valbonne, France, pp. 1-79.

Ericsson, et al. "Aspects on Distributed RRUs with Shared Cell-ID for Heterogeneous Deployments." 3GPP TSG-RAN WG1 #64, R1-110649, Taipei, Taiwan, Feb. 21-25, 2011, pp. 1-11.

Motorola Mobility. "Corrections to Rel-10 LTE-Advanced features in 36.213." Draft Change Request, 3GPP TSG-RAN Meeting #64, R1-111216, Taipei, Taiwan, Feb. 21-25, 2011, pp. 1-111.

* cited by examiner

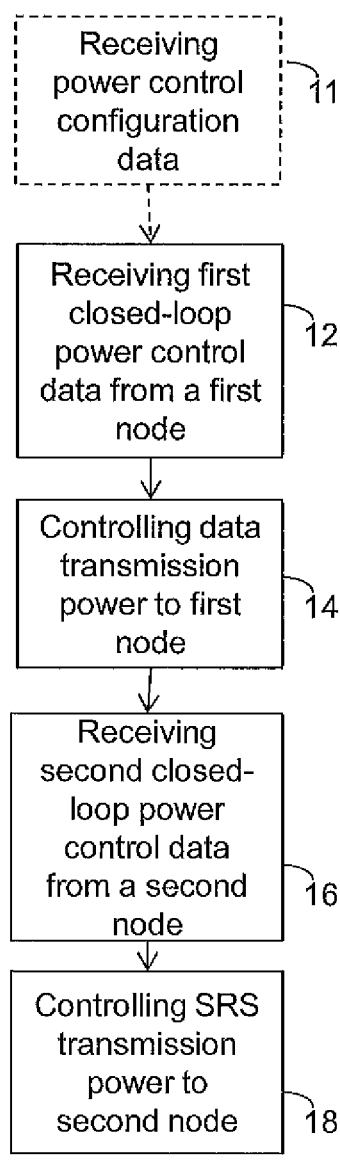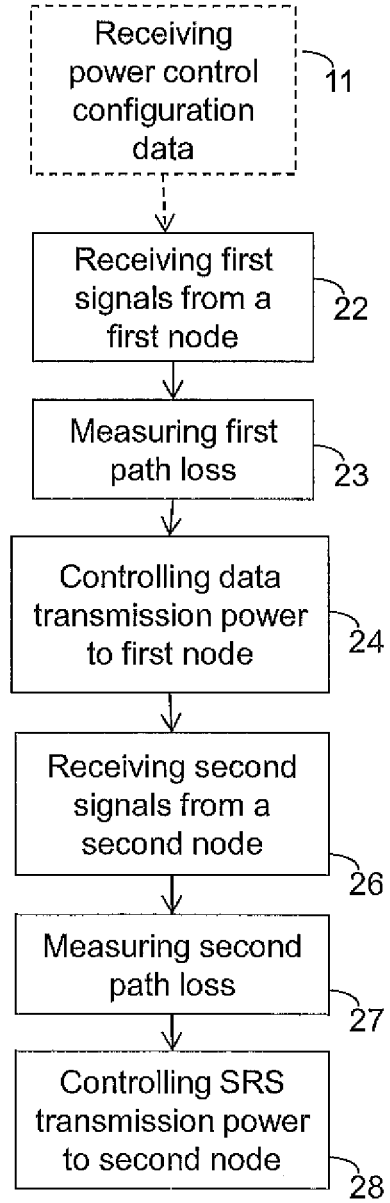
Fig. 16                    Fig. 17

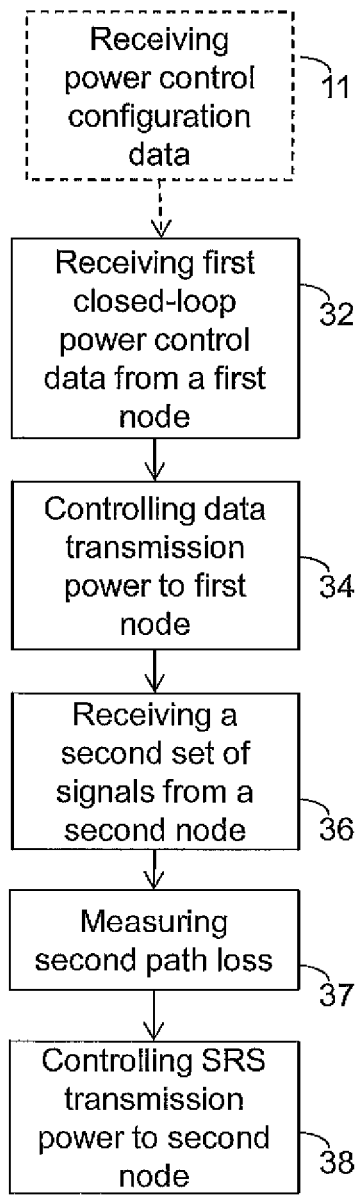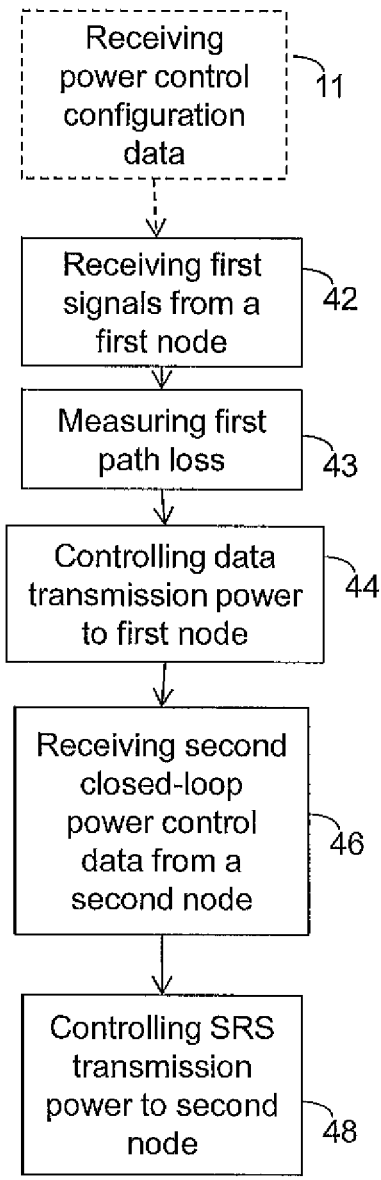
Fig. 18
Fig. 19

METHOD AND AN APPARATUS IN A USER EQUIPMENT FOR CONTROLLING TRANSMISSION POWER OF THE USER EQUIPMENT

TECHNICAL FIELD

The present disclosure relates generally to transmission power control of user equipments in wireless communication networks, and more particularly it relates to techniques for power control of transmitted data and reference signals in networks having heterogeneous cell deployments.

BACKGROUND

The $3^{rd}$-Generation Partnership Project (3GPP) is continuing development of the fourth-generation wireless network technologies known as Long-Term Evolution (LTE). Improved support for heterogeneous network operations is part of the ongoing specification of 3GPP LTE Release-10, and further improvements are being discussed in the context of new features for Release-11. In heterogeneous networks, a mixture of cells of different sizes and overlapping coverage areas are deployed.

One example of such a deployment is seen in the system 100 illustrated my FIG. 1, where several pico-cells, each comprising a base station 120 or low-power transmitting/receiving node with a respective coverage area 150, are deployed within the larger coverage area 140 of a macro-cell, which comprises a base station 110 or high-power transmitting/receiving node. The terms node or point refers to a base station of any kind. The system 100 of FIG. 1 is suggestive of a wide-area wireless network deployment. However, other examples of low-power nodes in heterogeneous networks are home base stations and relays. As will be discussed in further detail below, the large difference in output power, e.g., 46 dBm in macro cells and 30 dBm or less in pico cells, results in different interference scenarios from those that are seen in networks where all base stations have the same output power.

Throughout this document, nodes or points in a network are often referred to as being of a certain type, e.g., a "macro" node, or a "pico" point. However, unless explicitly stated otherwise, this should not be interpreted as an absolute quantification of the role of the node or point in the network but rather as a convenient way of discussing the roles of different nodes or points relative to one another. Thus, a discussion about macro- and pico-cells could just as well be applicable to the interaction between micro-cells and femto-cells, for example.

One aim of deploying low-power nodes such as pico base stations within the macro coverage area is to improve system capacity, by means of cell-splitting gains. In addition to improving overall system capacity, this approach also allows users to be provided with a wide-area experience of very-high-speed data access, throughout the network. Heterogeneous deployments are in particular effective to cover traffic hotspots, i.e., small geographical areas with high user densities. These areas can be served by pico cells, for example, as an alternative deployment to a denser macro network.

The most basic means to operate heterogeneous networks is to apply frequency separation between the different layers. For instance, the macro-cell 110 and pico-cells 120 pictured in FIG. 1 can be configured to operate on different, non-overlapping carrier frequencies, thus avoiding any interference between the layers. With no macro-cell interference towards the under-laid cells, i.e., the cells having coverage areas falling substantially or entirely within the coverage area of the macro-cell, cell-splitting gains are achieved when all resources can simultaneously be used by the under-laid cells.

One drawback of operating layers on different carrier frequencies is that it may lead to inefficiencies in resource utilization. For example, if there is a low level of activity in the pico-cells, it could be more efficient to use all carrier frequencies in the macro-cell, and then basically switch off the pico-cells. However, the split of carrier frequencies across layers in this basic configuration is typically done in a static manner.

Another approach to operating a heterogeneous network is to share radio resources between layers. Thus, two or more layers can use the same carrier frequencies, by coordinating transmissions across macro- and under-laid cells, such as pico or femto cells. This type of coordination is referred to as inter-cell interference coordination (ICIC). With this approach, certain radio resources are allocated to the macro cells for a given time period, whereas the remaining resources can be accessed by the under-laid cells without interference from the macro cell. Depending on the traffic situations across the layers, this resource split can change over time to accommodate different traffic demands. In contrast to the earlier described static allocation of carrier frequencies, this way of sharing radio resources across layers can be made more or less dynamic depending on the implementation of the interface between the nodes. In LTE, for example, an X2 interface has been specified in order to exchange different types of information between base station nodes, for coordination of resources. One example of such information exchange is that a base station can inform other base stations that it will reduce transmit power on certain resources.

Time synchronization between base station nodes is generally required to ensure that ICIC across layers will work efficiently in heterogeneous networks. This is of particular importance for time-domain-based ICIC schemes, where resources are shared in time on the same carrier.

Orthogonal Frequency-Division Multiplexing (OFDM) technology is a key underlying component of LTE. OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. SC-FDMA is described more fully in Myung, et al., "Single Carrier FDMA for Uplink Wireless Transmission," *IEEE Vehicular Technology Magazine*, vol. 1, no. 3, September 2006, pp. 30-38.

The basic LTE physical resource can be seen as a time-frequency grid. This concept is illustrated in FIG. 2, which shows a number of so-called subcarriers in the frequency domain, at a frequency spacing of Δf, divided into OFDM symbol intervals in the time domain. Each individual element of the resource grid 210 is called a resource element 220, and corresponds to one subcarrier during one OFDM symbol interval, on a given antenna port. One aspect of OFDM is that each symbol 230 begins with a cyclic prefix 240, which is essentially a reproduction of the last portion of the symbol 230 affixed to the beginning. This feature minimizes problems from multipath propagation, over a wide range of radio signal environments.

In the time domain, LTE downlink transmissions are organized into radio frames of ten milliseconds each, each radio frame consisting of ten equally-sized subframes of one millisecond duration. This is illustrated in FIG. 3, where an LTE signal 310 includes several frames 320, each of which is divided into ten subframes 330. Not shown in FIG. 3 is that each subframe 330 is further divided into two slots, each of which is 0.5 milliseconds in duration.

LTE link resources are organized into "resource blocks," defined as time-frequency blocks with a duration of 0.5 milliseconds, corresponding to one slot, and encompassing a bandwidth of 180 kHz, corresponding to 12 contiguous sub-carriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein.

In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

For scheduling of downlink data, the base station transmits control information in each subframe. This control information identifies the mobile terminals to which data is targeted and the resource blocks, in the current downlink subframe, that are carrying the data for each terminal. The first one, two, three, or four OFDM symbols in each subframe are used to carry this control signaling. In FIG. 4, a downlink subframe 410 is shown, with three OFDM symbols allocated to control region 420. The control region 420 consists primarily of control data elements 434, but also includes a number of reference symbols 432, used by the receiving station to measure channel conditions. These reference symbols 432 are interspersed at pre-determined locations throughout the control region 420 and among the data symbols 436 in the data portion 430 of the subframe 410.

Transmissions in LTE are dynamically scheduled in each subframe, where the base station transmits downlink assignments/uplink grants to certain mobile terminals, e g user equipments (UEs), in 3GPP terminology, via the physical downlink control channel (PDCCH). The PDCCHs are transmitted in the control region of the OFDM signal, i.e., in the first OFDM symbol(s) of each subframe, and span all or almost all of the entire system bandwidth. A UE that has decoded a downlink assignment, carried by a PDCCH, knows which resource elements in the subframe that contain data aimed for that particular UE. Similarly, upon receiving an uplink grant, the UE knows which time-frequency resources it should transmit upon. In the LTE downlink, data is carried by the physical downlink shared channel (PDSCH) and in the uplink the corresponding channel for carrying data is referred to as the physical uplink shared channel (PUSCH).

LTE also employs multiple modulation formats, including at least QPSK, 16-QAM, and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells. In addition, LTE uses a hybrid-ARQ (HARQ) error correction protocol where, after receiving downlink data in a subframe, the terminal attempts to decode it and reports to the base station whether the decoding was successful (ACK) or not (NACK). In the event of an unsuccessful decoding attempt, the base station can retransmit the erroneous data.

Demodulation of transmitted data generally requires estimation of the radio channel. In LTE systems, this is done using transmitted reference signals (RS), i.e., signals comprising symbols having values that are already known to the receiver. In LTE, cell-specific reference signals (CRS) are transmitted in all downlink subframes. In addition to assisting downlink channel estimation, the CRS are also used for mobility measurements performed by the UEs.

The CRS are generally intended for use by all the mobile terminals in the coverage area. To support improved channel estimation, especially when multiple-input multiple-output (MIMO) transmission techniques are used, LTE also supports UE-specific reference signals, which are targeted to individual mobile terminals and are intended specifically for channel estimation for demodulation purposes.

FIG. 4 illustrates how the mapping of physical control/data channels and signals can be done on resource elements within a downlink subframe 410. In the pictured example, the PDCCHs occupy only the first out of the three possible OFDM symbols that make up the control region 420, so in this particular case the mapping of data can begin at the second OFDM symbol. Since the CRS are common to all UEs in the cell, the transmission of CRS cannot be easily adapted to suit the needs of a particular UE. This is in contrast to UE-specific reference signals, by means of which each UE can have reference signals of its own placed in the data region 430 of FIG. 4, as part of PDSCH.

The length of the control region that is used to carry PDCCH, e.g., one, two, or three symbols, can vary on a subframe-to-subframe basis, and is signaled to the UE in the Physical Control Format Indicator CHannel (PCFICH). The PCFICH is transmitted within the control region, at locations known by terminals. Once a terminal has decoded the PCFICH, it then knows the size of the control region and in which OFDM symbol the data transmission starts.

Also transmitted in the control region is the Physical Hybrid-ARQ Indicator Channel. This channel carries ACK/NACK responses to a terminal, to inform the mobile terminal whether the uplink data transmission in a previous subframe was successfully decoded by the base station.

As noted above, CRS are not the only reference signals available in LTE. As of LTE Release-10, a new reference signal concept was introduced. Separate UE-specific reference signals for demodulation of PDSCH are supported in Release 10, as are reference signals specifically provided for measuring the channel for the purpose of generating channel state information (CSI) feedback from the UE. The latter reference signals are referred to as CSI-RS. CSI-RS are not transmitted in every subframe, and they are generally sparser in time and frequency than reference signals used for demodulation. CSI-RS transmissions may take place every fifth, tenth, twentieth, fortieth, or eightieth subframe, as determined by a periodicity parameter and a subframe offset, each of which are configured by Radio Resource Control (RRC) signaling.

A UE operating in connected mode can be requested by the base station to perform channel state information (CSI) reporting. This reporting can include, for example, reporting a suitable rank indicator (RI) and one or more precoding matrix indices (PM's), given the observed channel conditions, as well as a channel quality indicator (CQI). Other types of CSI are also conceivable, including explicit channel feedback and interference covariance feedback. The CSI feedback assists the base station in scheduling, including deciding which subframe and resource blocks to use for the transmission, as well as deciding which transmission scheme and/or precoder should be used. The CSI feedback also provides information that can be used to determine a proper user bit-rate for the transmission, i.e., for link adaptation.

In LTE, both periodic and aperiodic CSI reporting are supported. In the case of periodic CSI reporting, the terminal reports the CSI measurements on a configured periodic time basis, using the physical uplink control channel (PUCCH). With aperiodic reporting, the CSI feedback is transmitted on the physical uplink shared channel (PUSCH) at pre-specified time instants after receiving the CSI grant from the base station. With aperiodic CSI reports, the base station can thus request CSI that reflects downlink radio conditions in a particular subframe.

A detailed illustration of which resource elements within a resource block pair that may potentially be occupied by the new UE-specific reference signals (DMRS) and CSI-RS is provided in FIG. 5, for the cases in which two, four, and eight transmitter antenna ports are used for the CSI transmission. The CSI-RS utilizes an orthogonal cover code of length two to overlay two antenna ports on two consecutive resource elements. In other words, the CSI-RS are allocated in pairs, where two orthogonal codes of length two are transmitted simultaneously, using the same pair of allocated resource elements, from a pair of antenna ports at the base station.

In FIG. 5, the CSI-RS resource elements are designated with numbers, which correspond to antenna port numbers. In the left-hand diagram, corresponding to the case of two CSI-RS antenna ports, the possible positions for the CSI-RS are labeled "0" and "1", corresponding to antenna ports 0 and 1.

As can be seen in FIG. 5, many different CSI-RS patterns are available. For the case of two CSI-RS antenna ports, for instance, where each CSI-RS pair can be separately configured, there are twenty different patterns within a subframe. When there are four CSI-RS antenna ports, the CSI-RS pairs are assigned two at a time; thus the number of possible patterns is ten. For the case of eight CSI-RS antenna ports, five patterns are available. For TDD mode, some additional CSI-RS patterns are available.

In the following discussion, the term "CSI-RS resource" is used. A CSI-RS resource corresponds to a particular pattern present in a particular subframe. Thus two different patterns in the same subframe constitute two distinct CSI-RSI resources. Likewise, the application of the same CSI-RS pattern to two different subframes again represents two separate instances of a CSI-RS resource, and the two instances are thus again to be considered distinct CSI-RS resources.

Any of the various CSI-RS patterns pictured in FIG. 5 may also correspond to so-called zero-power CSI-RS, which are also referred to as muted REs. A zero-power CSI-RS is a CSI-RS pattern whose resource elements are silent, i.e., there is no transmitted signal on those resource elements. These silent patterns are configured with a resolution corresponding to the four-antenna-port CSI-RS patterns. Hence, the smallest unit of silence that may be configured corresponds to four REs.

The purpose of zero-power CSI-RS is to raise the signal-to-interference-plus-noise ratio (SINR) for CSI-RS in a given cell, by configuring zero-power CSI-RS in interfering cells so that the resource elements that would otherwise cause interference are silent. Thus, a CSI-RS pattern in a given cell is matched with a corresponding zero-power CSI-RS pattern in interfering cells.

Raising the SINR level for CSI-RS measurements is particularly important in applications such as coordinated multi point (CoMP) or in heterogeneous deployments. In CoMP, the UE is likely to need to measure the channel from non-serving cells. Interference from the much stronger serving cell would make those measurements difficult, if not impossible. Zero-power CSI-RS are also needed in heterogeneous deployments, where zero-power CSI-RS in the macro-layer are configured to coincide with CSI-RS transmissions in the pico-layer. This avoids strong interference from macro nodes when UEs measure the channel to a pico-node.

The PDSCH, which carries data targeted for mobile stations, is mapped around the resource elements occupied by CSI-RS and zero-power CSI-RS, so it is important that both the network and the UE are assuming the same CSI-RS and zero power CSI-RS configurations. Otherwise, the UE may be unable to properly decode the PDSCH in subframes that contain CSI-RS or their zero-power counterparts.

The CSI-RS discussed above are used for measurements of the downlink channel, i.e., from a base station to a mobile terminal. In the uplink, so-called sounding reference signals (SRS) may be used for acquiring CSI about the uplink channel from the UE to a receiving node. When SRS are used, they are transmitted on the last DFT-spread OFDM symbol of a subframe. SRS can be configured for periodic transmission as well for dynamic triggering as part of the uplink grant. The primary use for SRS is to aid the scheduling and link adaptation in the uplink. For time-division duplex (TDD) LTE systems, however, SRS are sometimes used to determine beam-forming weights for the downlink, by exploiting the fact that the downlink and uplink channels are the same when the same carrier frequency is used for downlink and uplink, i e there is channel reciprocity.

While PUSCH carries data in the uplink, PUCCH is used for control. PUCCH is a narrowband channel using a resource block pair where the two resource blocks are on opposite sides of the potential scheduling bandwidth. PUCCH is used for conveying ACK/NACKs, periodic CSI feedback, and scheduling request to the network.

Before an LTE terminal can communicate with an LTE network it first has to find and acquire synchronization to a cell within the network, a process known as cell search. Next, the UE has to receive and decode system information needed to communicate with and operate properly within the cell. Finally, the UE can access the cell by means of the so-called random-access procedure.

In order to support mobility, a terminal needs to continuously search for, synchronize to, and estimate the reception quality of both its serving cell and neighbor cells. The reception quality of the neighbor cells, in relation to the reception quality of the current cell, is then evaluated in order to determine whether a handover, for terminals in connected mode, or cell re-selection, for terminals in idle mode, should be carried out. For terminals in connected mode, the handover decision is taken by the network, based on measurement reports provided by the terminals. Examples of such reports are reference signal received power (RSRP) and reference signal received quality (RSRQ).

The results of these measurements, which are possibly complemented by a configurable offset, can be used in several ways. The UE can, for example, be connected to the cell with the strongest received power. Alternatively, the UE can be assigned to the cell with the best path gain. An approach somewhere between these alternatives may be used.

These selection strategies do not always result in the same selected cell for any given set of circumstances, since the base station output powers of cells of different type are different. This is sometimes referred to as link imbalance. For example, the output power of a pico base station or a relay node is often on the order of 30 dBm (1 watt) or less, while a macro base station can have an output power of 46 dBm (40 watts). Consequently, even in the proximity of the pico cell, the downlink signal strength from the macro cell can be larger than that of the pico cell. From a downlink perspective, it is often better to select a cell based on downlink received power, whereas from an uplink perspective, it would be better to select a cell based on the path loss.

These alternative cell selection approaches are illustrated in FIG. 6. The solid lines emanating from each of macro-cell 110 and pico-cell 120 represent the received power at each point between the two cells. These lines intersect, i.e., are equal, at border 540. Accordingly, a UE within region 510 will see a stronger received signal from the pico-cell 120, and will get the best downlink performance if it selects pico-cell 120. The dashed lines issuing from pico-cell 120 and macro-cell 110, on the other hand, represent the path loss between a UE at a given point and either the macro-cell 110 or the pico-cell 120. Because the path loss is not weighted by the transmitter output power, these lines intersect at a point halfway between macro-cell 110 and pico-cell 120, as seen at the border 530. A UE outside region 520, then, will experience a lower path loss to macro-cell 110 than to pico-cell 120, and will thus achieve better uplink performance if it selects macro-cell 110. Because of this unbalanced situation, there is a region, i.e., the portion of coverage area 520 that is outside coverage area 510, in which neither cell is optimal for both downlink and uplink performance at the same time.

From a system perspective, it might often be better, in the above scenario, for a given UE to connect to the pico-cell 120 even under some circumstances where the downlink from macro-cell 110 is much stronger than the pico cell downlink. However, ICIC across layers will be needed when the terminal operates within the region between the uplink and downlink borders, i.e., the link imbalance zone, as depicted in FIG. 6.

Interference coordination across the cell layers is especially important for the downlink control signaling. If the interference is not handled appropriately, a terminal that is in the region between the downlink and uplink borders in FIG. 6 and is connected to pico-cell 120 may be unable to receive the downlink control signaling from the pico-cell 120.

One approach to providing ICIC across layers is illustrated in FIG. 7. An interfering macro-cell, which could create downlink interference towards a pico-cell, transmits a series of subframes 710, but avoids scheduling unicast traffic in certain subframes 712. In other words, neither PDCCHs nor PDSCH are transmitted in those subframes 712. In this way, it is possible to create low-interference subframes, which can be used to protect users of the pico-cell who are operating in the link imbalance zone.

To carry out this approach, the macro-base station (MeNB) indicates to the pico-base station (PeNB), via the backhaul interface X2, which subframes will not be used to schedule users. The PeNB can then take this information into account when scheduling users operating within the link imbalance zone, such that these users are scheduled only in subframes 722 aligned with the low-interference subframes transmitted in the macro layer. In other words, these users are scheduled only in interference-protected subframes. Pico-cell users operating within the downlink border, e.g., within coverage area 510 in FIG. 6, can be scheduled in all subframes, i.e., in both the protected subframes 722 as well as the remaining, un-protected, subframes in the series of subframes 720.

In principle, data transmission, but generally not control signaling, in different layers could also be separated in the frequency domain by ensuring that scheduling decisions in the two cell layers are non-overlapping in the frequency domain. This could be facilitated by exchanging coordination messages between the different base stations. However, this is not possible for the control signaling, since the control signaling spans the full bandwidth of the signal, according to the LTE specifications, and hence a time-domain approach must be used.

The classical way of deploying a network is for each different transmission/reception point to provide coverage for a cell that is distinct from all others. That is, the signals transmitted from or received at one point are associated with a cell identifier (cell-id) that is different from the cell-id employed for other nearby points. Typically, each of these points transmits its own unique signals for broadcast, e.g., the Physical Broadcast Channel (PBCH), as well as for sync channels, such as the primary synchronization signal (PSS) and secondary synchronization signal (SSS).

The concept of a "point" is heavily used in conjunction with techniques for coordinated multipoint (CoMP). In this context, a point corresponds to a set of antennas covering essentially the same geographical area in a similar manner. One transmitting/receiving node, such as an LTE base station, might control one or several points. Thus, a point might correspond to one of the sectors at a base station site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Techniques for CoMP entail introducing dependencies in the scheduling or transmission/reception among different points, in contrast to conventional cellular systems where a point is operated more or less independently from the other points, from a scheduling point of view.

The classical strategy of one cell-id per point is depicted in FIG. 8 for a heterogeneous deployment where a number of low-power, e.g., pico, points 120 are placed within the coverage area of a higher power macro point 110. In this deployment, the pico-nodes transmit different cell identifiers, i.e., "cell-id 2", "cell-id 3", and "cell-id 4", from the cell identifier "cell-id 1" transmitted by the macro-cell 110. Note that similar principles obviously also apply to classical macro-cellular deployments where all points have similar output power and perhaps are placed in a more regular fashion than what is the case for a heterogeneous deployment.

An alternative to the classical deployment strategy is to instead let all the UEs within a geographical area outlined by the coverage of the high-power macro point be served with signals associated with the same cell-id. In other words, from a UE perspective, the received signals appear as though they come from a single cell. This is illustrated in FIG. 9. Here, all of the pico-nodes 120 transmit the same cell identifier, "cell-id 1", which is also used by the overlaying macro-cell 110, i.e., the cell having a coverage area that contains, at least substantially the coverage area for one or more of the pico-cells.

Note that in both FIGS. 8 and 9 only one macro point is shown; other macro points would typically use different cell-ids, e.g., corresponding to different cells, unless they are co-located at the same site, e.g., corresponding to other sectors of the macro site. In the latter case of several co-located macro points, the same cell-id may be shared across the co-located macro-points and those pico points that correspond to the union of the coverage areas of the macro points. Sync, BCH and control channels are all transmitted from the high-power point while data can be transmitted to a UE also from low-power points by using shared data transmissions (PDSCH) that rely on UE-specific reference signals.

Such an approach has benefits for those UEs that are capable of receiving PDSCH based on UE-specific reference signals, while UEs that only support CRS for PDSCH have to settle for using only the transmission from the high-power point, and thus will not benefit in the downlink from the deployment of extra low-power points. This latter group is likely to include at least all Release 8 and 9 UEs for use in frequency-division duplex (FDD) LTE systems.

The single cell-id approach for heterogeneous and/or hierarchical cell deployments is geared towards situations in which there is fast backhaul communication between the points associated with the same cell identifier. A typical case would be a base station serving one or more sectors on a macro level as well as having fast fiber connections to remote radio units (RRUs) performing the role of the other points that share the same cell-id. Those RRUs could represent low-power points with one or more antennas each. Another example is when all the points have a similar power class, with no single point having more significance than the others. The base station would then handle the signals from all RRUs in a similar manner.

A clear advantage of the shared cell-id approach compared with the classical one is that the handover procedure between cells only needs to be invoked on a macro basis. Another important advantage is that interference from CRS can be greatly reduced, since CRS does not have to be transmitted from every point. There is also much greater flexibility in coordination and scheduling among the points, which means the network can avoid relying on the inflexible concept of semi-statically configured low-interference subframes, as illustrated in FIG. 7. A shared-cell approach also allows decoupling of the downlink from the uplink, so that, for example, path-loss-based reception-point selection can be performed for the uplink, without creating a severe interference problem for the downlink, where the UE may be served by a transmission point different from the point used in the uplink receptions.

SUMMARY

It is an object to address at least some of the problems and issues outlined above. Another object may be to improve power control of a user equipment connected to a wireless network such that signals sent wirelessly to a plurality of network nodes are received with a suitable power level at the plurality of network nodes. It is possible to achieve these objects and others by using a method and an apparatus as defined in the attached independent claims.

According to one aspect, a method is provided in a user equipment for controlling transmission power of the user equipment when the user equipment is connected to a wireless network. The method comprises receiving first closed-loop power control data from a first network node corresponding to transmission of data from the user equipment to the first network node; controlling transmission power for transmission of data to the first network node based on the received first closed-loop power control data; receiving second closed-loop power control data from a second network node corresponding to transmission of sounding reference signals, SRS, from the user equipment to the second network node; and controlling transmission power for transmission of SRS, to the second network node based on the received second closed-loop power control data.

According to a second aspect, another method is provided in a user equipment for controlling transmission power of the user equipment when the user equipment is connected to a wireless network. The method comprises: receiving a first set of reference signals from a first network node; measuring a first path loss based on the received first set of reference signals; controlling data transmission power for transmission of data to the first network node based on the measured first path loss; receiving a second set of reference signals from a second network node; measuring a second path loss based on the received second set of signals; and controlling transmission power for transmission of Sounding Reference Signals, SRS, to the second network node based on the measured second path loss.

According to a third aspect, another method is provided in a user equipment for controlling transmission power of the user equipment when the user equipment is connected to a wireless network. The method comprises: receiving first closed-loop power control data from a first network node corresponding to transmission of data from the user equipment to the first network node; controlling transmission power for transmission of data to the first network node based on the received first closed-loop power control data, receiving a second set of reference signals from a second network node, measuring a second path loss based on the received second set of reference signals, and controlling transmission power for transmission of Sounding Reference Signals, SRS, to the second network node based on the measured second path loss.

According to a fourth aspect, another method is provided in a user equipment for controlling transmission power of the user equipment when the user equipment is connected to a wireless network. The method comprises: receiving a first set of reference signals from a first network node, measuring a first path loss based on the received first set of reference signals, controlling data transmission power for transmission of data to the first network node based on the measured first path loss, receiving second closed-loop power control data from a second network node corresponding to transmission of Sounding reference signals, SRS, from the user equipment to the second network node, and controlling transmission power for transmission of SRS to the second network node based on the received second closed-loop power control data.

These four aspects describe different alternative ways of making it possible to control transmission power of the user equipment for the transmission of SRS and data independently. Thereby, it is possible to adapt the transmission of data and SRS to differing channel conditions for data transmissions and SRS transmission conditions. This is especially advantageous if the SRS are destined to one base station and traffic data is destined to another base station. For example, the SRS may be destined to a macro base station, but traffic data may be destined to a pico base station arranged within the coverage area of the macro base station.

According to another aspect, an arrangement in a user equipment is provided for controlling transmission power of the user equipment when the user equipment is connected to a wireless network. The arrangement comprises a receiver for receiving first closed-loop power control data from a first network node corresponding to transmission of data from the user equipment to the first network node, and for receiving second closed-loop power control data from a second network node corresponding to transmission of sounding reference signals, SRS from the user equipment to the second network node. The arrangement also comprises a processing unit for controlling transmission power for transmission of data to the first network node based on the received first closed-loop power control data, and for controlling transmission power for transmission of SRS to the second network node based on the received second closed-loop power control data.

According to another aspect, an arrangement in a user equipment is provided for controlling transmission power of the user equipment when the user equipment is connected to a wireless network. The arrangement comprises a receiver for receiving a first set of reference signals from a first network node, and for receiving a second set of reference signals from a second network node, and a measuring unit for measuring a first path loss based on the received first set of signals, and for measuring a second path loss based on the received second set of signals. The arrangement also comprises a processing unit for controlling data transmission power for transmission of data to the first network node based on the measured first path loss, and for controlling transmission power for transmission of Sounding Reference Signals, SRS, to the second network node based on the measured second path loss.

According to another aspect, an arrangement in a user equipment is provided for controlling transmission power of the user equipment when the user equipment is connected to a wireless network. The arrangement comprises a receiver for receiving first closed-loop power control data from a first network node corresponding to transmission of data from the user equipment to the first network node, and for receiving a second set of reference signals from a second network node and a measuring unit for measuring a path loss based on the received second set of reference signals. The arrangement also comprises a processing unit for controlling transmission power for transmission of data to the first network node based on the received first closed-loop power control data, and for controlling transmission power for transmission of Sounding Reference Signals, SRS, to the second network node based on the measured path loss.

According to yet another aspect, an arrangement in a user equipment is provided for controlling transmission power of the user equipment when the user equipment is connected to a wireless network. The arrangement comprises a receiver for receiving a first set of reference signals from a first network node and for receiving second closed-loop power control data from the second network node corresponding to transmission of sounding reference signals, SRS, from the user equipment to the second network node, and a measuring unit for measuring a path loss based on the received first set of reference signals. The arrangement also comprises a processing unit for controlling data transmission power for transmission of data to the first network node based on the measured path loss, and for controlling transmission power for transmission of SRS to the second network node based on the received second closed-loop power control data.

These four aspects of arrangements in user equipments describe different alternative arrangements for making it possible to control transmission power of the user equipment for the transmission of SRS and data independently. Thereby, it is possible to adapt the transmission of data and SRS to differing channel conditions for data transmissions and SRS transmission conditions. This is especially advantageous if the SRS are destined to one base station and traffic data is destined to another base station. For example, the SRS may be destined to a macro base station, but traffic data may be destined to a pico base station arranged within the coverage area of the macro base station.

According to another aspect, a method in a network node system is provided for communicating user equipment transmission power data with a user equipment when the user equipment is connected to a wireless network, the network node system comprising a first network node and a second network node. At the first network node the method comprises measuring signal strength on a data signal received from the user equipment, and sending first closed loop power control data to the user equipment, the first closed loop power control data being based on the measured signal strength, thus enabling the user equipment to control data transmission power for transmission of data to the first network node. At the second network node the method comprises measuring signal strength on a reference signal received from the user equipment, and sending second closed loop power control data to the user equipment, the power control data being based on the measured signal strength, thus enabling the user equipment to control SRS transmission power for transmission of SRS to the second network node.

According to another aspect, a network node system is provided for controlling transmission power of a user equipment when the user equipment is connected to a wireless network, the network node system comprising a first network node and a second network node. The first network node comprises a measuring unit for measuring signal strength on a signal received from the user equipment, and a transmitter for sending first closed loop power control data to the user equipment, the first closed loop power control data being based on the signal strength measured by the measuring unit, thus enabling the user equipment to control data transmission power for transmission of data to the first network node. The second network node comprises a measuring unit for measuring signal strength on a signal received from the user equipment, and a transmitter for sending second closed-loop power control data to the user equipment, the second closed-loop power control data being based on the signal strength measured by the measuring unit, thus enabling the user equipment to control SRS transmission power for transmission of SRS to the second network node.

Further possible features and benefits of this solution will become apparent from the detailed description below.

BRIEF DESCRIPTION OF THE DRAWINGS

FIG. 16 is a flow chart illustrating a method in a user equipment according to an embodiment.

FIGS. 17-19 are flow charts illustrating other methods in a user equipment according to other embodiments.

DETAILED DESCRIPTION

Figure 1:
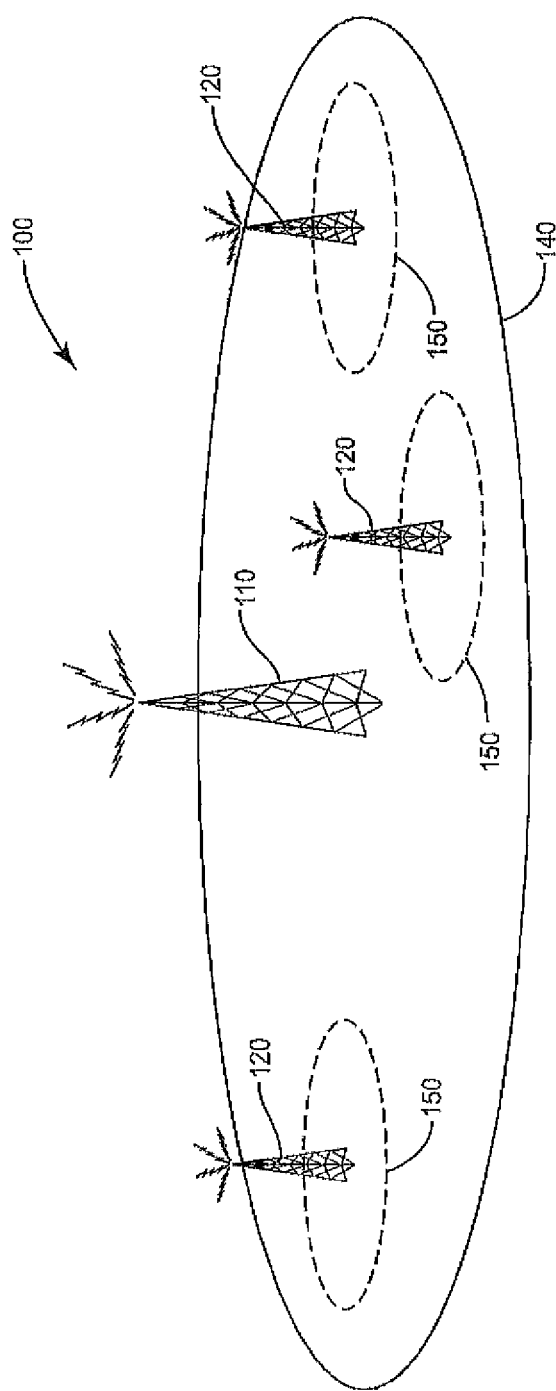
FIG. 1 illustrates several pico-cells overlaid by a macro-cell.
Figure 2:
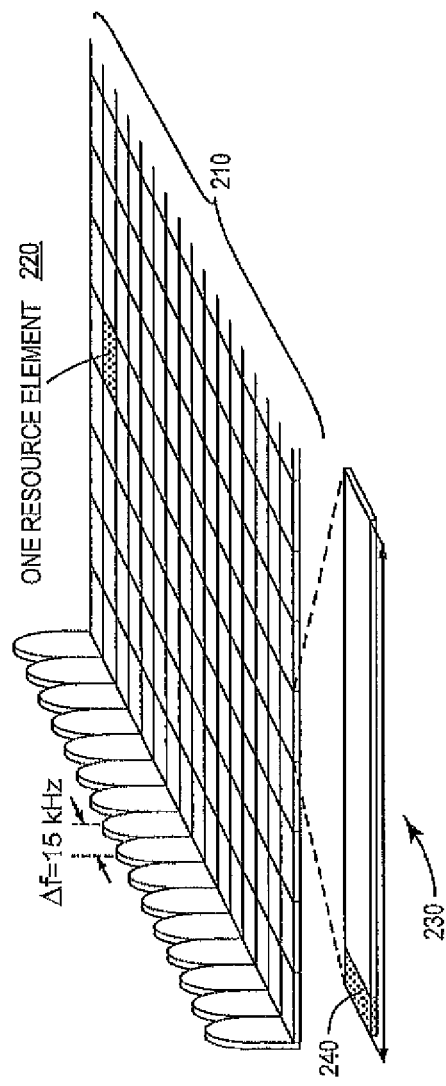
FIG. 2 illustrates features of the OFDM time-frequency resource grid.
Figure 3:
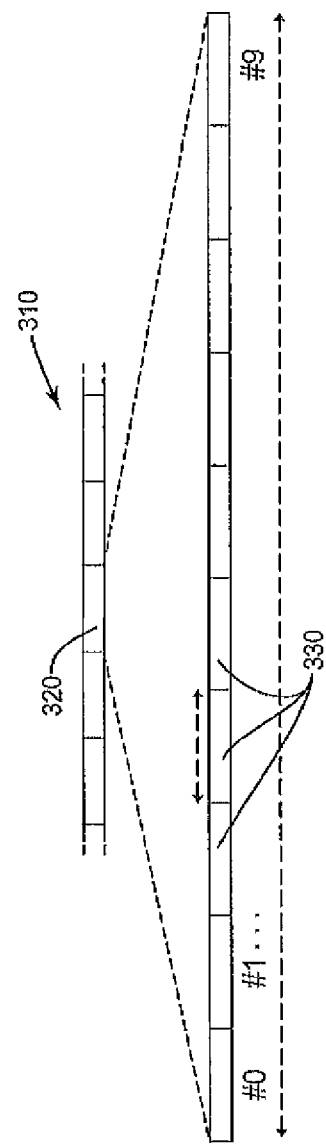
FIG. 3 illustrates the time-domain structure of an LTE signal.
Figure 4:
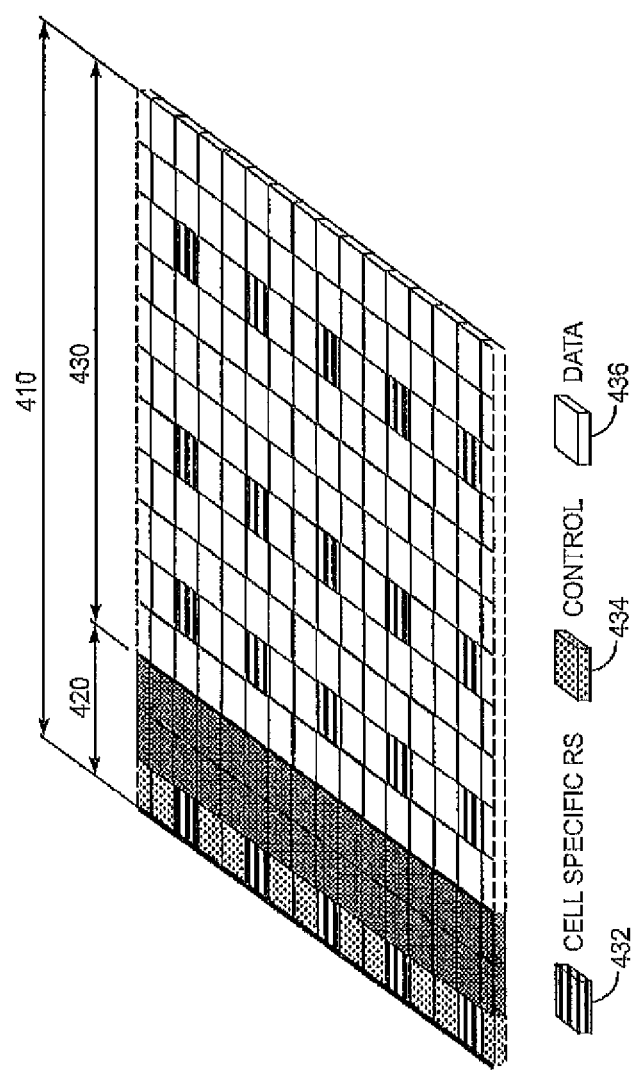
FIG. 4 illustrates features of an LTE downlink subframe.
Figure 5:
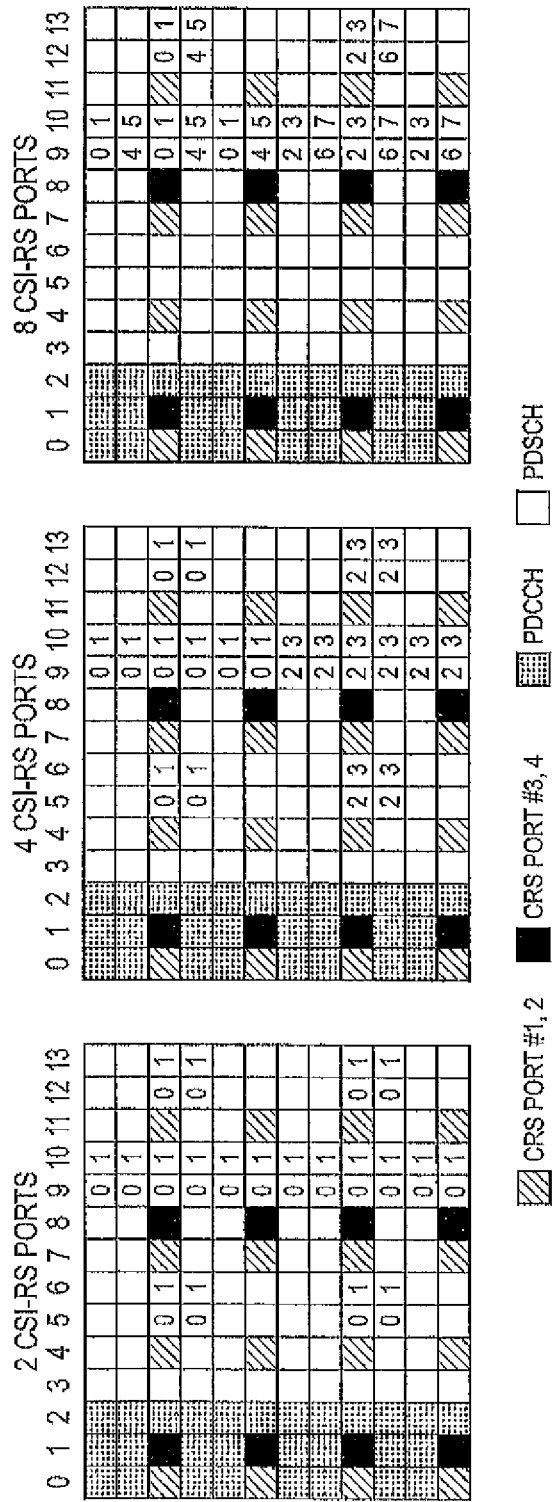
FIG. 5 illustrates the mapping of CSI-RS to an LTE resource grid for two, four, and eight antenna ports.
Figure 6:
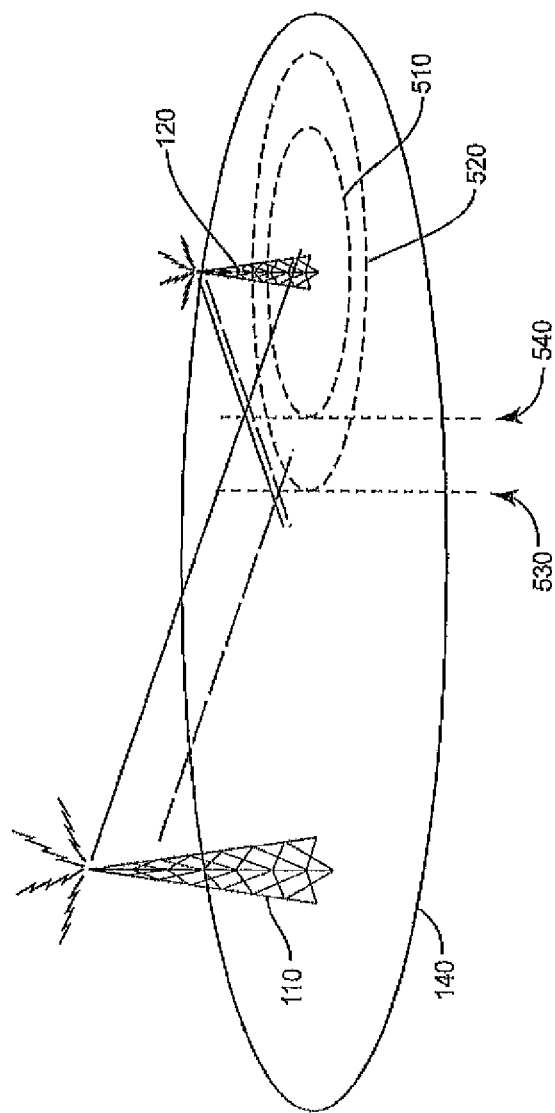
FIG. 6 illustrates the differences between uplink and downlink coverage in a mixed cell scenario.
Figure 7:
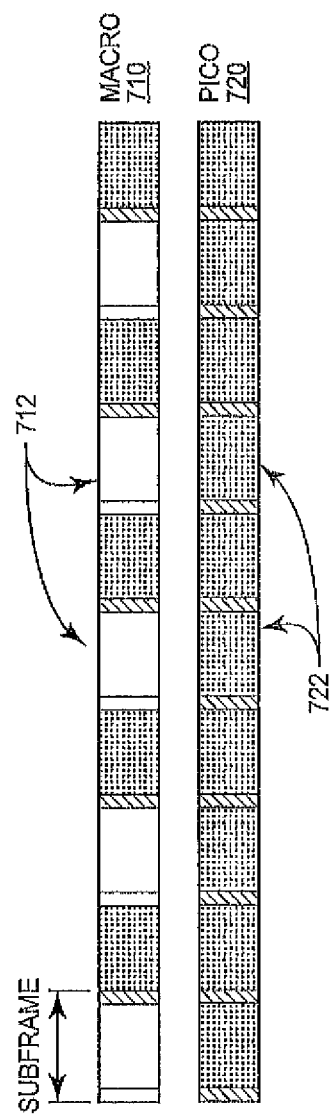
FIG. 7 illustrates the use of inter-cell interference coordination in downlink subframes in a heterogeneous network.
Figure 8:
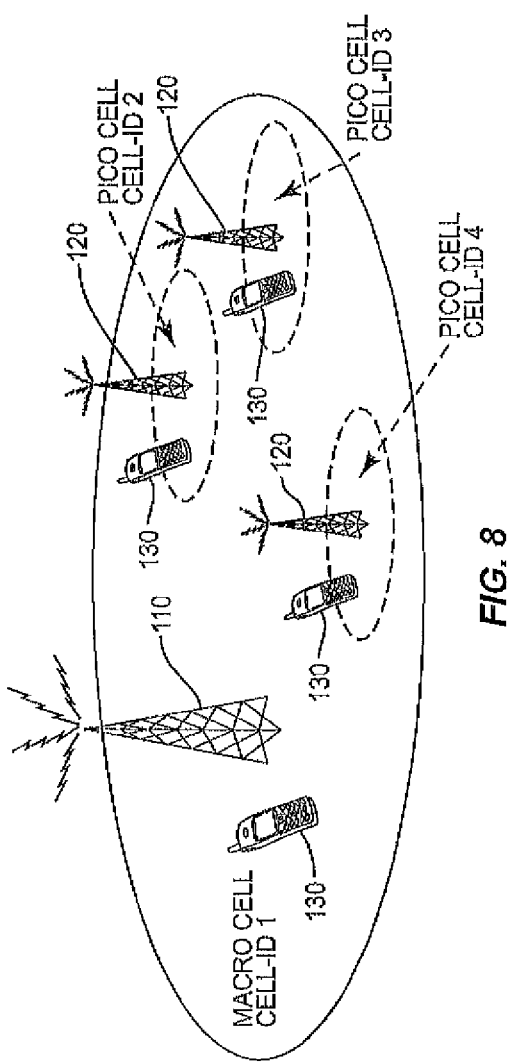
FIG. 8 illustrates a heterogeneous cell deployment where a separate cell-id is used for each point.
Figure 9:
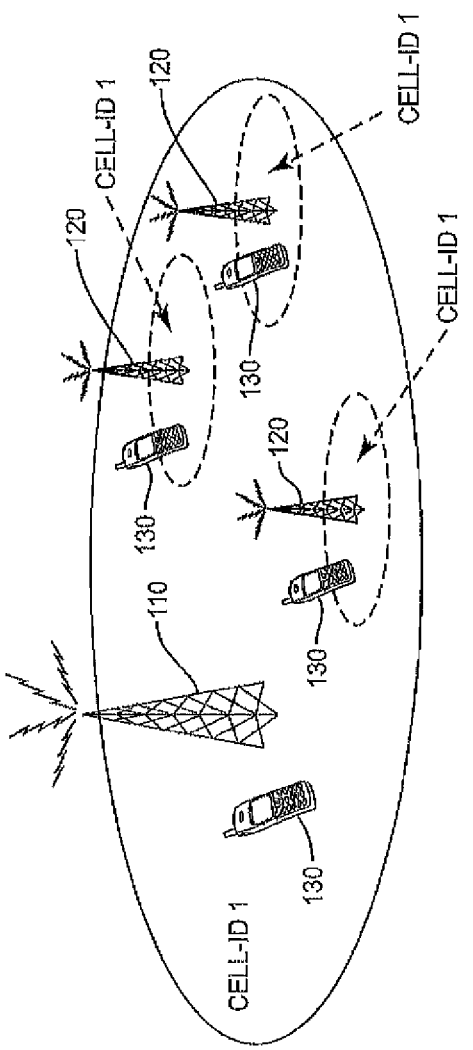
FIG. 9 illustrates a heterogeneous cell deployment where the cell-id is shared between the macro-point and pico-points in the macro-point's coverage area.

Various embodiments are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this document as an example, this should not be seen as limiting the scope of the invention to only these systems. Other wireless systems including or adapted to include heterogeneous cell deployments may also benefit from exploiting the ideas covered herein.

Dynamic control of mobile station transmission power is a common feature in cellular systems. The objectives of uplink power control commonly include: (a) reaching a sufficient received power and signal quality on the used channel at the serving base station, (b) limiting the received power, and thereby interference, at non-serving base stations, (c) limiting the received power, and thereby interference, on non-used channels at the serving base station and (d) reducing the output power level to limit power consumption and save battery life in the mobile station.

Power control schemes can generally be divided in to the categories "closed-loop" and "open-loop," depending on what type of measurement input is used. Closed-loop schemes make use of measurements on the same link direction that the power control applies to, i.e., on the uplink for uplink closed loop power control. Open-loop schemes make use of measurements on the opposite link direction, i.e., on the downlink for uplink open-loop power control. Closed-loop schemes are typically more accurate than open-loop schemes, but also require more control signaling overhead.

According to 3GPP's Release 10 specifications, uplink power control in LTE is performed by estimating a path loss (PL) term and combining it with various UE- and cell-specific power offset terms. An example power control formula from these specifications is in the form:

$$P=\min(P_{max}, 10 \log 10(M+P_0+\alpha*PL+C))[dBm], \quad (1)$$

where $P_{max}$ represents a cap on the output power (in dBm), M represents the scheduled UL bandwidth, $P_0$ is a UE- and/or cell-specific power offset, ⌐ is a cell-specific fractional path loss compensation factor, PL is an estimate of the path loss performed by the UE and C is a correction term. In some implementations, C can be obtained as a combination of multiple power correction terms, including, for example, closed-loop power control correction terms.

According to the LTE specifications, a UE estimates the path loss PL based on the difference (in dB) between the received power for cell-specific common reference signals (CRS) and the nominal power of such reference signals:

$$PL=\text{referenceSignalPower}-\text{higher layer filtered RSRP}, \quad (2)$$

where referenceSignalPower is configured by higher layer signaling and RSRP is defined for the reference serving cell. Filtering of the RSRP may be configured by higher layer signaling, e.g., by Radio Resource Control (RRC) signaling, and performed by the UE. The serving cell chosen as the reference serving cell and used for determining referenceSignalPower and higher layer filtered RSRP is configured by the higher layer parameter pathlossReferenceLinking.

As currently specified by 3GPP, the transmit powers of PUSCH and PUCCH physical channels, as well as the transmit power of sounding reference signals (SRS), are set by the uplink power control algorithm. While power control for PUSCH and PUCCH are independent of one another, SRS power control is the same as for PUSCH. This means that except for an offset that is specific for SRS, the transmit power of PUSCH and SRS are always the same in relation to their bandwidth.

One problem with the approach described above is that when the UE is in the pico base station (BS) coverage zone (or range extension zone), it is desirable to adjust PUSCH transmit power based on the pathloss to the pico base station, since there is no need for the signal to be received at the macro base station, which is much further away and would require much higher Tx power. However, if control of the SRS transmit power is tied directly to control of PUSCH power, the SRS transmit power will also be adjusted based on the pathloss to the pico base station in this scenario. As a result, the UE SRS will often be undetectable at the macro base station. This is particularly problematic for time-division duplexing (TDD) transmission schemes that rely on channel reciprocity, where a measure of the uplink channel is required at all base stations that are potentially available for use as downlink transmission nodes.

Additional problems arise from mobility of the mobile stations, such as when a UE belonging to a pico cell moves away from the pico node and towards a macro base station. Assuming that the UE is served by both the macro base station and pico base station in the downlink, it is desirable that the SRS power is calibrated according to the pathloss from the macro base station, in which case the SRS power should progressively decrease as the UE moves towards the macro base station. However, according to the current specifications, the UE will increase PUSCH transmission power, due to the pathloss to the pico base station becoming higher as the UE moves away from the pico-BS. Thus, the SRS power will also increase. This unnecessarily high SRS transmit power causes battery drain at the UE and unnecessary interference to the network.

Closed-loop power control by itself fails to address any of these problems, since the same closed-loop power control instance is used for both PUSCH and SRS. This means that it is currently not possible to adjust independently the transmit power of SRS and PUSCH through closed-loop power control.

Per the current specifications for LTE, the transmit powers of data (PUSCH) and SRS are currently set (in dBm units) according to equations (3) and (4) respectively:

$$P_{PUSCH,c}(i) = \min\left\{\begin{array}{l} P_{CMAX,c}(i), (10\log_{10}(M_{PUSCH,c}(i)) + \\ +P_{O\_PUSCH,c}(j) + \alpha_c(j) \cdot PL_c + \Delta_{TF,c}(i) + f_c(i) \end{array}\right\} \quad (3)$$

and $$P_{SRS,c}(i) = \\ \min\left\{\begin{array}{l} P_{CMAX,c}(i), (P_{SRS\_OFFSET,c}(m) + \\ +10\log_{10}(M_{SRS,c}) + P_{O\_PUSCH,c}(j) + \alpha_c(j) \cdot PL_c + f_c(i) \end{array}\right\} \quad (4)$$

These equations have parameters corresponding very closely to the parameters of equation (1), except that these parameters are, where indexed by a subscript PUSCH or SRS, specific to the corresponding channels. Comparing equations (3) and (4), it is observed that except for the term accounting for the bandwidth, the only term specific to SRS is $P_{SRS\_OFFSET,c}$. This specific SRS power offset could be a potential solution to the described problems, but the fact of being signaled asynchronously does not make it a preferred solution.

According to several embodiments of the present disclosure, the parts of the power control formula that correspond to the path loss estimate and/or a closed loop power control function are allowed to operate in an independent manner for data (e.g., PUSCH, in LTE) and for sounding reference signals (SRS). The details of this independent operation at the UE can be either explicitly configured by the base station (eNodeB, in LTE), or may be predetermined by hard-coding of the power control process in the UE. In either case, the path loss estimate used for power control on PUSCH can differ from that used when power controlling SRS. Likewise, the closed-loop power control part for data can be different from the closed-loop power control part used for SRS, in various embodiments.

Pathloss can be estimated using different sets of reference signals for data and SRS, enabling independent pathloss estimates to be used for power control of PUSCH and SRS. One approach is to use different CSI-RS patterns/resources for the two independent pathloss estimates. With this approach, one set of CSI-RS patterns can correspond to transmissions from a macro base station, while another can correspond to transmissions from the pico node. The CSI-RS patterns used at the UE for CSI feedback measurement can be reused, either completely or in part, to perform pathloss estimation for SRS power control.

An important aspect of some embodiments of the disclosure is enabling the UE to calculate and use different pathloss estimates for SRS and PUSCH power control. Assuming the use of a more flexible type of reference signals than CRS (such as CSI-RS) for pathloss estimation, the UE is instructed to measure pathloss on two different sets of reference signals, which we can name set X and set Y, and perform power control of PUSCH and SRS based on set X and Y respectively. These sets may be demodulation reference signals (DMRS), CSI-RS, CRS or other types of RS, or any combination thereof. Further, sets X and Y need not be the same types of reference signals, i.e., the reference signals in set X may be a different type of reference signals than the reference signals in set Y.

One possible candidate for reference signals set Y that may be used for SRS power control is the set of reference signals used by the UE to perform measurements for CSI feedback, or a subset thereof, since transmission mechanisms relying on channel reciprocity such as TDD-based coordinated multipoint (COMP) transmission require CSI feedback of the channel from the UE to all the base stations within the heterogeneous network cell. Reusing a set of reference signals that are already used by some other functionality is beneficial, since the same set does not need to be configured twice, e.g., once for CSI feedback and once for SRS power control. Alternatively, the knowledge of the set used for CSI feedback can be exploited for reducing the signaling overhead related to configuring a subset for SRS. In other words, the signaling for configuring SRS power control measurements can identify a particular subset of reference signals that have already been identified for CSI feedback purposes, thus reducing the number of bits needed to identify the signals used for SRS power control.

An additional aspect of several embodiments is the use of two separate closed-loop power control instances for SRS and PUSCH power adjustment instead of one. The use of two independent loops for SRS and PUSCH power adjustment is motivated in heterogeneous networks by the need to adjust SRS and PUSCH with different criteria, since as described above, reception of PUSCH may be only needed at certain base station nodes, whereas SRS reception may be needed at another set of base station nodes due to the use of reciprocity based transmission schemes. A variation of this approach is to introduce support for letting the choice of closed-loop/open-loop power control to be made independently for PUSCH and SRS power control. Thus the closed-loop power control data could be made to be applied only to PUSCH and not to SRS, or vice-versa. In that way, open-loop power control using path loss estimate corresponding to the macro node would be used for SRS while closed-loop power control would be used for adjusting PUSCH power towards the relevant pico node in a heterogeneous deployment.

The solutions described above can improve uplink power control (PC) in heterogeneous network scenarios by decoupling pathloss estimation and closed-loop PC for PUSCH and SRS power control. This makes the use of reciprocity-based transmission schemes which require SRS to be measured at all potential downlink serving base stations within the cell possible, while PUSCH power can be reduced in order to be received only at certain base station nodes close to the UE.

Figure 10:
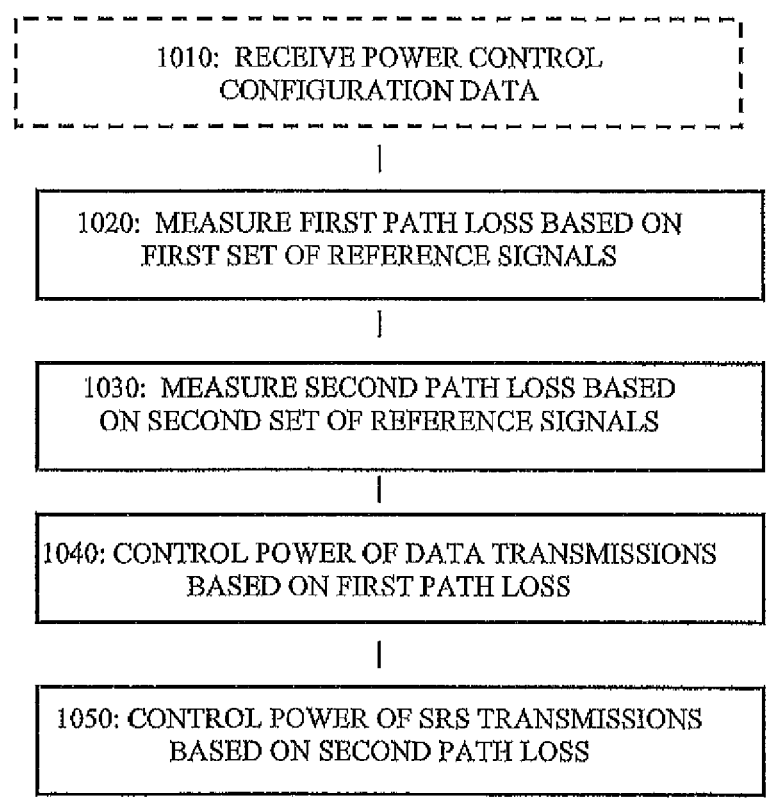
FIG. 10 is a process flow diagram illustrating a method for power control in a heterogeneous cell deployment

With the several approaches discussed above in mind, those skilled in the art will appreciate that FIG. 10 illustrates a process flow diagram according to several embodiments of the present disclosure, such as might be implemented in a UE operating in a network that includes a primary transmitting node, having a first coverage area, and one or more secondary transmitting nodes, each having a corresponding coverage area that falls within the first coverage area. The illustrated process begins, as shown at block 1010, with the receiving of power control configuration data, e.g., signaled to the UE from a base station, such as the primary transmitting node. This step may not explicitly appear in every case, as all or part of the power control configuration may be pre-determined, e.g., pre-programmed, in some embodiments.

The illustrated technique continues, as shown at blocks 1020 and 1030, with the measurement of first and second path losses, based on first and second sets of reference signals, respectively. As discussed earlier, these first and second sets of reference signals may comprise different CSI-RS patterns, in some cases, or some other reference signals, or some combination of both. As shown at blocks 1040 and 1050, the power levels for data transmissions and SRS transmissions from the UE are controlled, separately, based on the measured first path loss and measured second path loss, respectively.

Figure 11:
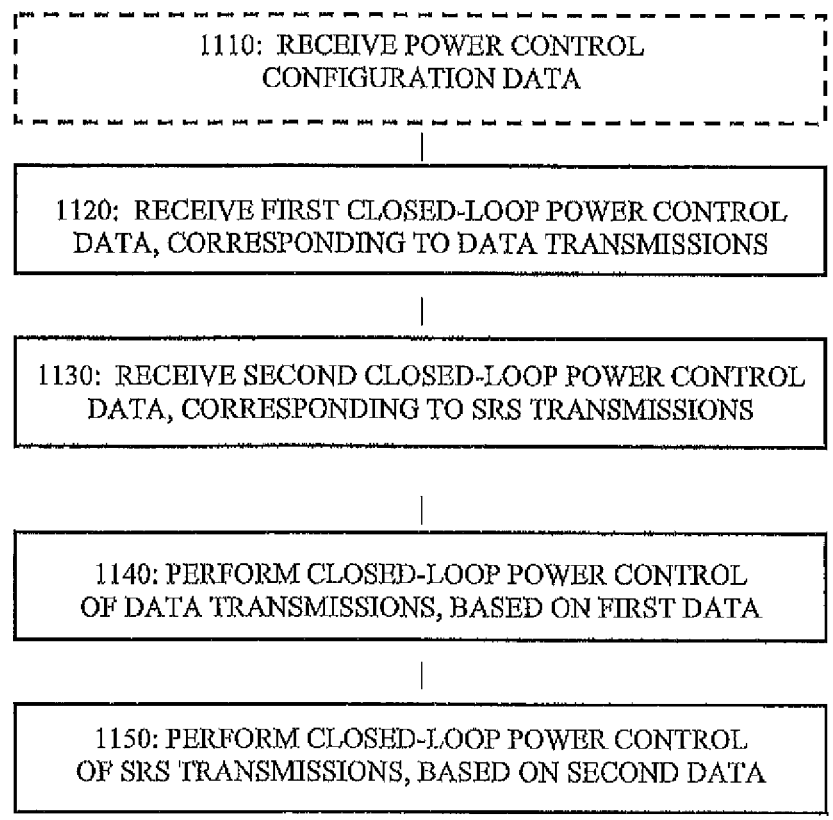
FIG. 11 is a process flow diagram illustrating another method for power control in a heterogeneous cell deployment.

FIG. 11 illustrates another embodiment of the power control techniques described above. Once again, as shown at block 1110, the process begins with the receiving of power control configuration data. Once again, however, this step may not appear in every embodiment, as the UE may be pre-configured with this data. As shown at blocks 1120 and 1130, the UE receives first closed-loop power control data and second closed-loop power control data, corresponding to data transmissions (e.g., PUSCH) and to sounding reference signal (SRS) transmissions, respectively. The closed-loop power control data may comprise explicit power control commands (e.g., UP/DOWN) commands, in some embodiments, or measurement data corresponding to the UE's uplink transmissions, or some combination of both. As shown at blocks 1140 and 1150, the UE performs separate closed-loop power control operations for data transmissions and SRS transmissions, respectively.

Other embodiments of the inventive techniques disclosed herein include a wireless system, including a primary node and one or more secondary nodes, corresponding to the methods and techniques described above. In some cases, the methods/techniques described above will be implemented in a system of transmitting nodes such as the one pictured in detail in FIG. 12.

Figure 12:
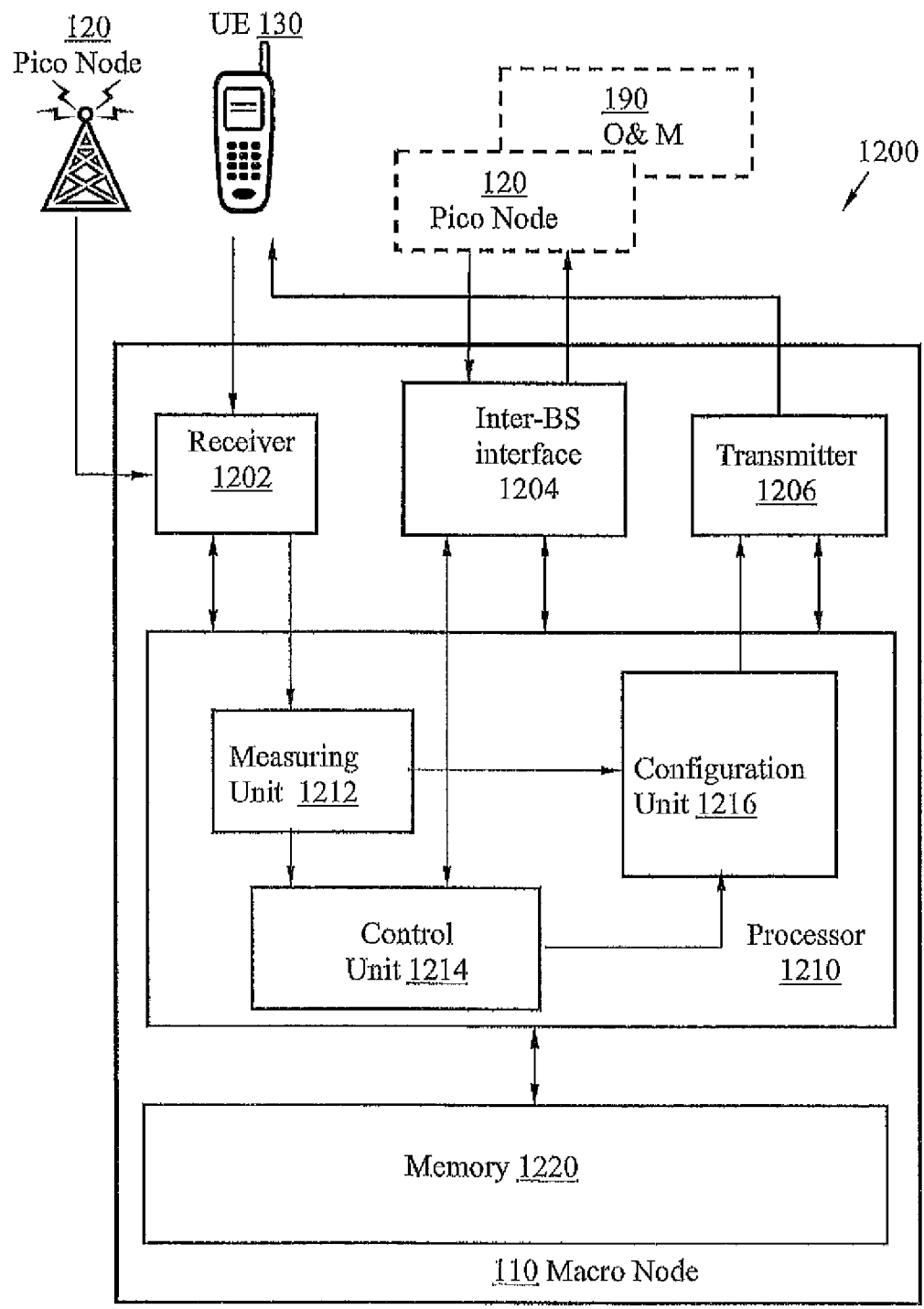
FIG. 12 is a block diagram illustrating features of nodes in a heterogeneous cell deployment.

The system pictured in FIG. 12 includes a macro node 110, two pico nodes 120, a UE 130, and an O&M node 190. The macro node 110 is configured to communicate with pico nodes 120 and O&M node 190 via inter-base-station interface 1204, which comprises suitable network interface hardware controlled by software carrying out network interfacing protocols. Macro node 110 includes a receiver 1202 and transmitter 1206 for communicating with UE 130; in some cases receiver 1202 may also be configured to monitor and/or measure signals transmitted by pico node 120. Receiver circuit 1202 and transmitter circuit 1206 use known radio processing and signal processing components and techniques, typically according to a particular telecommunications standard such as the 3GPP standard for LTE-Advanced. Because the various details and engineering tradeoffs associated with the design of interface circuitry and radio transceiver circuits are well known and are unnecessary to a full understanding of the invention, additional details are not shown here.

Macro node 110 further includes a processing circuit 1210, which includes one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory 1220, along with stored radio parameters. Again, because the various details and engineering tradeoffs associated with the design of baseband processing circuitry for mobile devices and wireless base stations are well known and are unnecessary to a full understanding of the invention, additional details are not shown here. However, several functional aspects of the processing circuit 1210 are shown, including a measuring unit 1212, a control unit 1214, and a configuration unit 1216. Configuration unit 1216 controls radio transmitter 1206 to transmit CRS, CSI-RS, and PDSCH, under the control of control unit 1214, which also manages the communications with other nodes via inter-BS interface circuit 1204. Control unit 1214 also evaluates data obtained from measuring unit 1212, such as channel state information and/or load information, and controls inter-base-station communication and transmitter configuration accordingly.

Program code stored in memory circuit 1220, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described above, in several embodiments, such as signaling power control configuration data to one or more UEs, participating in closed-loop power control operations, etc. Radio parameters stored in memory 1220 may include one or more pre-determined tables or other data for supporting these techniques, in some embodiments.

Pico nodes 120 may comprise components and functional blocks very similar to those illustrated in macro node 110, with the corresponding control units being responsible for receiving control instructions from a macro node 110, or other pico node 120, and configuring the pico node's transmitter circuits accordingly.

Figure 13:
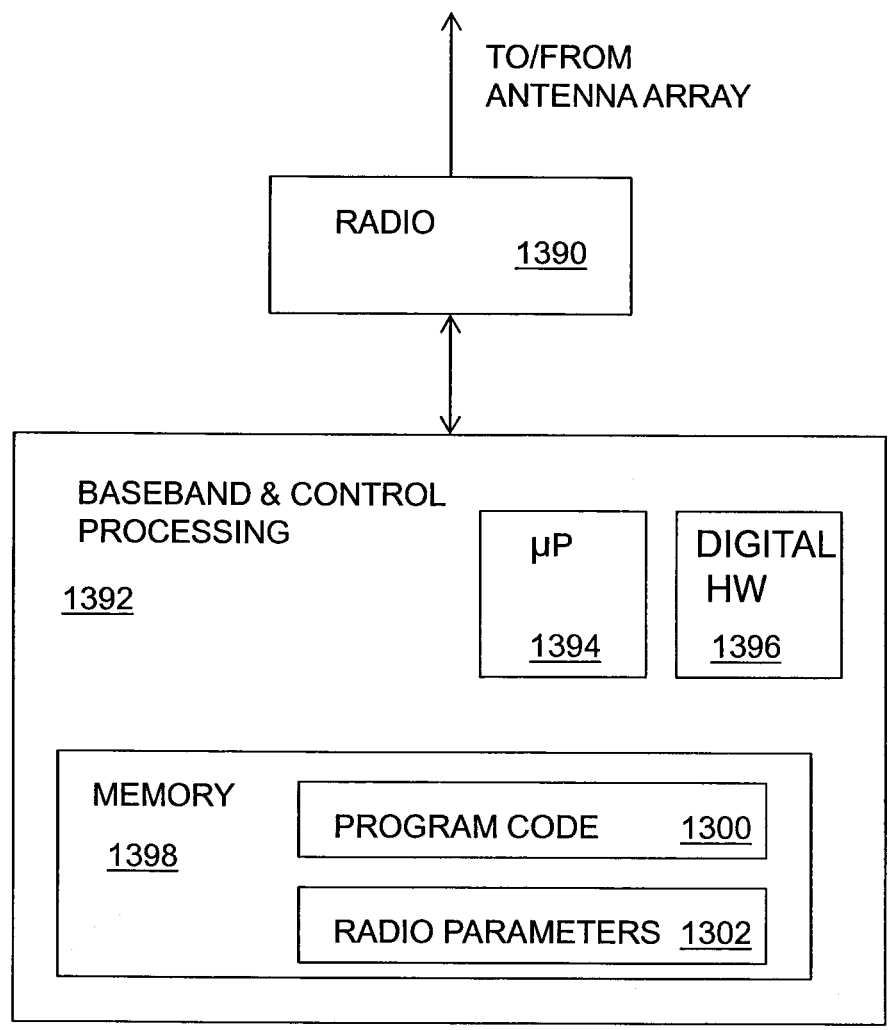
FIG. 13 is a block diagram illustrating an example wireless transceiver configured according to some embodiments of the disclosure.

FIG. 13 illustrates an example wireless transceiver apparatus, such as might be found in a terminal, e.g., mobile station or user equipment (UE), illustrating a few of the components relevant to the present techniques. The pictured apparatus includes radio circuitry 1390 and baseband & control processing circuit 1392. Radio circuitry 1390 includes receiver circuits and transmitter circuits that use known radio processing and signal processing components and techniques, typically according to a particular telecommunications standard such as the 3GPP standard for LTE-Advanced. Because the various details and engineering tradeoffs associated with the design of such circuitry are well known and are unnecessary to a full understanding of the invention, additional details are not shown here.

Baseband & control processing circuit 1392 includes one or more microprocessors or microcontrollers 1394, as well as other digital hardware 1396, which may include digital signal processors (DSPs), special-purpose digital logic, and the like. Either or both of microprocessor(s) 1390 and digital hardware 1396 may be configured to execute program code 1300 stored in memory 1398, along with radio parameters 1302. Again, because the various details and engineering tradeoffs associated with the design of baseband processing circuitry for mobile devices and wireless base stations are well known and are unnecessary to a full understanding of the invention, additional details are not shown here.

The program code 1300 stored in memory 1398, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 1302 may include, for example, one or more pre-determined tables or other data relating SRS bits, which may be both implicit and explicit, to SRS configurations, so that the base station and mobile station will have a mutual understanding of the SRS configuration to be used in any given situation. Radio parameters 1302 may also include correction factors for use in path loss computations, measurement data, and the like.

Examples of several embodiments of the present disclosure have been described in detail above, with reference to the attached illustrations of specific embodiments. The various embodiments of the present disclosure include, but are not limited to: mobile stations, or, more generally, wireless transceivers, suitable for use in heterogenous cell deployments and configured to transmit data signals and reference signals to one or more remote stations, such as eNodeBs in an LTE system. In some embodiments, the transmitted reference signal is a sounding reference signal (SRS). These mobile stations or wireless transceivers comprise processing and control circuits configured to perform power control of the data and reference signal transmissions independently.

In some embodiments, the processing and control circuits separately measure first and second path losses based on first and second sets of reference signals, respectively, where the first and second sets of reference signals are received from one or more remote stations, and control the power level of the data transmissions based on the first path loss and the power level of the reference signal transmission based on the second path loss. In some instances, for example, the first set of reference signals may correspond to CSI-RS transmitted by a pico node, while the second set of reference signals correspond to CSI-RS transmitted by a macro node. However, other reference signals from other types of remote station may be used.

In other embodiments the processing and control circuits receive first closed-loop power control data corresponding to data transmissions by the mobile station or wireless transceiver, and second closed-loop power control data corresponding to reference signal transmissions (e.g., SRS transmissions) by the mobile station or wireless transceiver. The processing and control circuits perform closed-loop power independently for data and reference signal transmissions, based on the first and second closed-loop power control data, respectively. The closed-loop power control data may comprise explicit power-control commands, such as up/down power control commands, or measurement data corresponding to, for example, data transmissions and reference signal transmissions by the mobile station. The first and second closed-loop power control data may be received from separate base stations, in some instances, or may be received from a single base station.

In still other embodiments, open-loop power control may be applied to one of the data transmissions or SRS transmissions, while closed-loop power control is applied to the other. In some of these embodiments, the processing and control circuit may be configured to select a power control mode to apply to one or both of the data transmissions and SRS transmissions based on various criteria such as signal conditions or operating mode, such as whether the mobile station is receiving signals from or transmitting signals to multiple base stations.

Other embodiments of the invention include base stations and/or related network nodes comprising processing circuitry and radio circuitry adapted to send control messages to mobile stations according to the techniques described above. Some embodiments include base stations and/or related network nodes that are configured to measure either uplink data transmissions or reference signal transmissions for a mobile station, or both, and transmit closed-loop power control data separately for data transmissions and/or reference signals.

Figure 14:
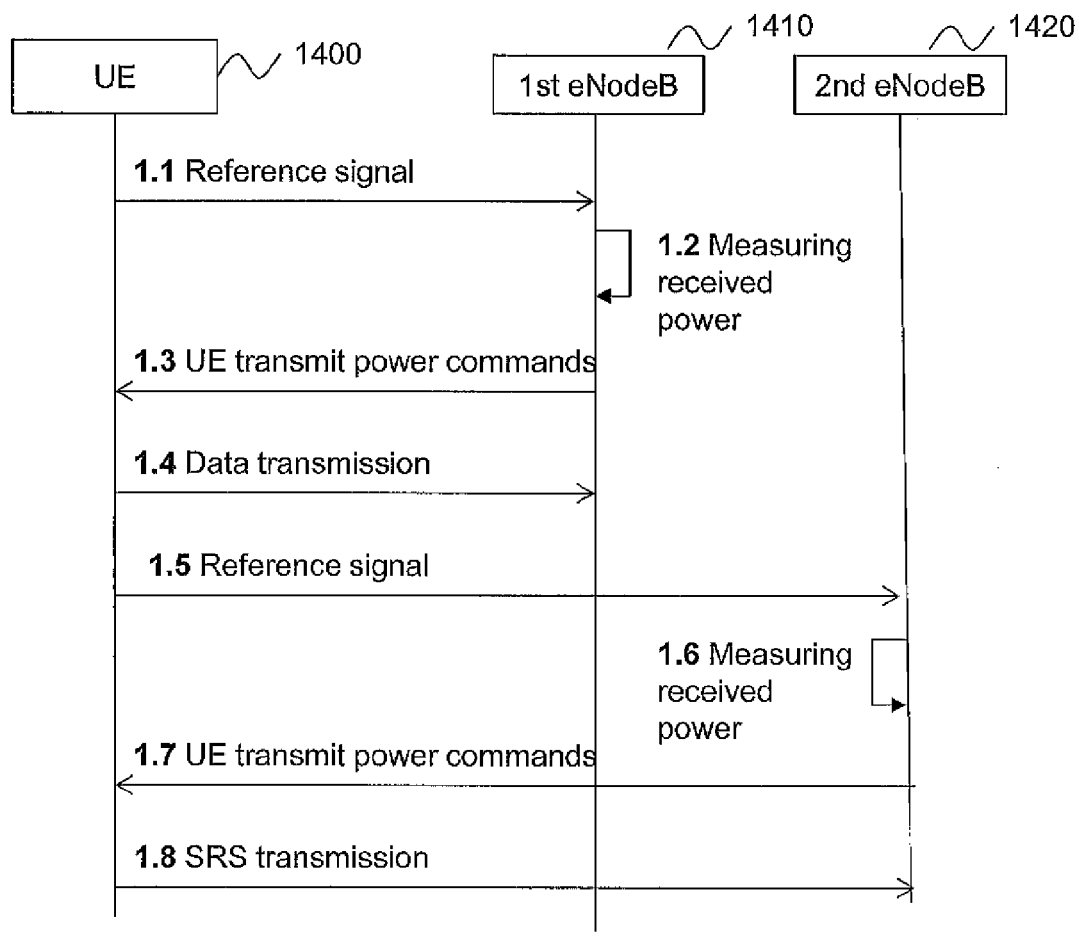
FIG. 14 is a signaling diagram according to a first embodiment.

FIG. 14 is a further explanation of closed-loop power control according to an embodiment of the method shown in FIG. 11. In the figure, a UE 1400 sends 1.1 a signal to a first network node (eNodeB) 1410, to which it is sending traffic data, or will send traffic data. The signal may be a reference signal, i.e. any signal already in use by the system for other purposes. The first eNodeB 1410 measures 1.2 received power, or signal strength, of the received signal. Based on the received signal strength, and prior knowledge of nominal value of the signal, i.e. the signal strength with which the signal was sent from the UE, the first eNodeB 1410 may calculate an appropriate power level for the UE. Thereafter, the eNodeB sends 1.3 transmit power commands to the UE comprising the calculated appropriate power level. The UE responds by transmitting 1.4 traffic data to the first eNodeB 1410 using the received transmit power commands comprising the appropriate power level. Alternatively, instead of calculating an appropriate power level and sending transmit power commands, the first eNodeB 1410 may send the measured received signal strength values back to the UE 1400 and let the UE calculate appropriate transmit power levels.

Further, the UE 1400 sends 1.5 a signal to a second network node (eNodeB) 1420, to which it is sending SRS, or will send SRS. The signal may be a reference signal, i.e. any signal used in the system for performing channel measurements, such as the SRS signal. The second eNodeB 1420 measures 1.6 received power, or signal strength, of the received signal. Based on the received signal strength, and prior knowledge of nominal value of the signal, i.e. the signal strength with which the signal was sent from the UE 1400, the second eNodeB 1420 may calculate an appropriate power level for the UE. Thereafter, the second eNodeB sends 1.7 transmit power commands to the UE comprising the calculated appropriate power level. The UE responds by transmitting 1.8 SRS signals to the second eNodeB 1420 using the received transmit power commands comprising the appropriate power level. Alternatively, instead of calculating an appropriate power level and sending transmit power commands, the second eNodeB 1420 may send the measured received signal strength values back to the UE 1400 and let the UE calculate appropriate transmit power levels.

As shown in FIG. 14, separate closed power control loops are used for controlling power level of data destined to a first eNodeB and power level of SRS destined to a second eNodeB. Thereby, SRS can be transmitted on an appropriate level for reaching the eNodeB that is to receive the SRS, and data can be sent on another transmit level appropriate for reaching the eNodeB that is to receive data.

As mentioned, and as shown above, closed loop power control data is data that make use of measurements on the same link direction that the power control applies, in this case on the uplink. With other words, closed-loop power control data received at the user equipment are data related to the user equipment's transmission to the network node, e.g. related to the transmission power needed from the user equipment to reach the network node.

Figure 15:
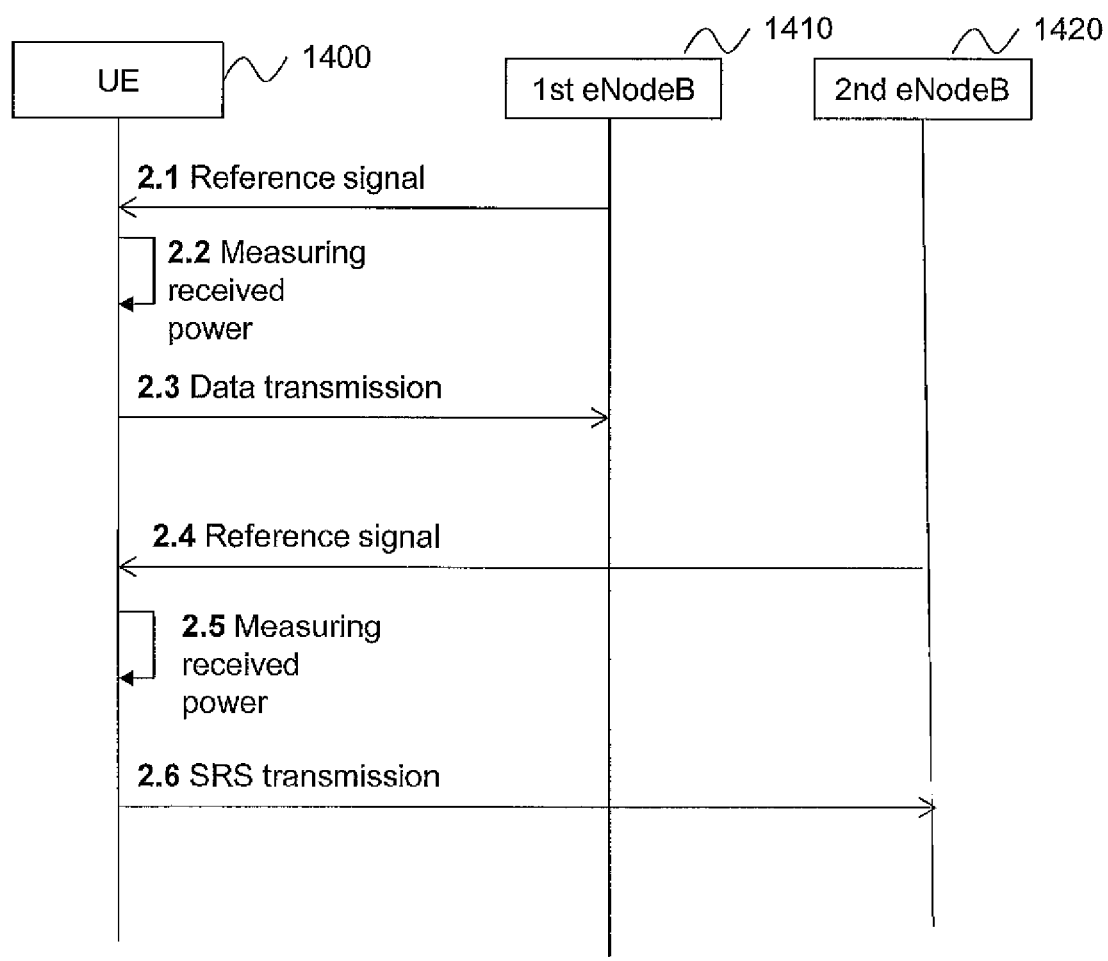
FIG. 15 is a signaling diagram according to another embodiment.

The method shown in FIG. 10, on the other hand, is, as mentioned, based on an open-loop scheme, or technique. In the technique shown in FIG. 10, the UE measures on downlink signals, to control power levels for signals sent on the uplink. This technique is further illustrated in FIG. 15. A first eNodeB 1410 sends 2.1 a signal, which may be a reference signal, to the UE 1400. The UE measures 2.2 received power and calculates path loss based on the received power level and a nominal power value of the sent signal. The UE then controls its transmit power level for transmission 2.3 of data to the first eNodeB 1410 based on the calculated path loss, i.e. the UE calculates an appropriate transmit power level based on the calculated path loss in the downlink and controls its transmit power level for transmission of data to the first network node according to the calculated transmit power level. Similarly, a second eNodeB 1420 sends 2.4 a signal, which may be a reference signal, to the UE 1400. The UE measures 2.5 received power and calculates path loss based on the received power level and a nominal power value of the sent signal. The UE then controls its transmit power level for transmission 2.6 of SRS to the second eNodeB 1420 based on the calculated path loss, i.e. the UE calculates an appropriate transmit power level based on the calculated path loss in the downlink and controls its transmit power level for transmission of SRS to the second network node according to the calculated transmit power level.

In this method, separate open-loop power control instances are used for controlling power level of data destined to a first eNodeB and of SRS destined to a second eNodeB. Thereby, SRS can be transmitted on an appropriate level for reaching the eNodeB that is to receive the SRS, and data can be sent on another transmit level appropriate for reaching the eNodeB that is to receive data.

FIGS. 16-19 described four alternative embodiments of methods in a user equipment for controlling transmission power of the user equipment when the user equipment is connected to a wireless network. The four alternative embodiments have an inventive concept in common in that they make it possible to control data transmission and SRS transmission from a UE separately. Thereby, it is possible to adapt the transmission power level of data and SRS to differing channel conditions for data transmissions and SRS transmission conditions.

The first alternative embodiment method, shown in FIG. 16 comprises receiving 12 first closed-loop power control data from a first network node corresponding to transmission of data from the user equipment to the first network node and controlling 14 transmission power for transmission of data to the first network node based on the received first closed-loop power control data. The method further comprises receiving 16 second closed-loop power control data from a second network node corresponding to transmission of sounding reference signals, SRS, from the user equipment to the second network node, and controlling 18 transmission power for transmission of SRS to the second network node based on the received second closed-loop power control data. The method may be preceded by the optional step of receiving 11 power control configuration data from the network.

The second alternative embodiment method, shown in FIG. 17 comprises receiving 22 a first set of reference signals from a first network node, measuring 23 a first path loss based on the received first set of reference signals and controlling 24 data transmission power for transmission of data to the first network node based on the measured first path loss. The method further comprises receiving 26 a second set of reference signals from a second network node, measuring 27 a second path loss based on the received second set of signals and controlling 28 transmission power for transmission of SRS to the second network node based on the measured second path loss. The method may be preceded by the optional step of receiving 11 power control configuration data from the network.

The third and fourth alternatives embodiment methods are mixes of the first and second alternative embodiments. The third alternative embodiment, shown in FIG. 18 comprises receiving 32 first closed-loop power control data from a first network node corresponding to transmission of data from the user equipment to the first network node and controlling 34 transmission power for transmission of data to the first network node based on the received first closed-loop power control data. The method further comprises receiving 36 a second set of reference signals from a second network node, measuring 37 a second path loss based on the received second set of reference signals and controlling 38 transmission power for transmission of SRS to the second network node based on the measured second path loss. The method may be preceded by the optional step of receiving 11 power control configuration data from the network.

The fourth alternative, shown in FIG. 19 comprises receiving 42 a first set of reference signals from a first network node, measuring 43 a first path loss based on the received first set of reference signals and controlling 44 data transmission power for transmission of data to the first network node based on the measured first path loss. The method further comprises receiving 46 second closed-loop power control data from a second network node corresponding to transmission of Sounding reference signals, SRS, from the user equipment to the second network node and controlling 48 transmission power for transmission of SRS to the second network node based on the received second closed-loop power control data. The method may be preceded by the optional step of receiving 11 power control configuration data from the network.

In the above, the term "first" in first closed-loop power control data, first signals, and first path loss relates to that the data and signals are related to the first node. Similarly, the term "second" in second closed-loop power control data, second signals, and second path loss relates to that the data and signals are related to the second node. By closed-loop power control data is meant power control data related to the same transmission direction and link as the data to be controlled. I.e. data for the uplink transmission link between the UE and a network node is measured and used for controlling transmission power on the same link. Consequently, closed-loop power control data from a first network node corresponding to transmission of data from the user equipment to the first network node, means power control data based on an uplink transmission from the UE to the first network node, which power control data is to be used for controlling the transmission of data over the same link to the first network node. Similarly, closed-loop power control data from a second network node corresponding to transmission of SRS from the user equipment to the second network node, means power control data based on an uplink transmission from the UE to the second network node, which power control data is to be used for controlling the transmission of SRS over the same link to the second network node. By "power control data" is meant data for controlling power level.

According to an embodiment, some of the four alternatives may be performed simultaneously. I.e. both the open-loop and the closed-loop alternatives may be used for controlling the same link simultaneously.

According to an embodiment, the reference signals are signals comprising symbols having values already known by the UE.

According to another embodiment, the reference signals are any of the following: Channel State Information Reference signals, CSI-RS, demodulation reference signals, DMRS, or Cell-specific reference signals CRS.

According to an embodiment, the first closed-loop power control data may be power control commands or measurement data, corresponding to the user equipment's uplink transmission to the first network node. Further, the second closed-loop power control data may be power control commands or measurement data, corresponding to the user equipment's uplink transmission to the second network node. Power control commands may be commands to increase or decrease transmission power level with a certain amount or to a certain power level. Measurement data may be measurements of received power level at the network node, i.e. received uplink power level.

According to another embodiment, the methods further comprises receiving 11 power control configuration data from the first and/or the second network node. Power control configuration data may be data specifying how the UE should act for controlling power for sending data and SRS.

According to an embodiment, the first network node and the second network node are separate network nodes. By using this method for adapting transmission power of SRS to a separate base station than the transmission power of data, it is possible to keep up a good communication with both a base station to which data is primarily directed, but at the same time achieving a communication of SRS to another base station to which SRS is primarily directed. This is especially advantageous in the case where the UE is within radio communication distance to both a first base station having a first coverage area, e.g a pico base station, and a second base station having a second coverage area being larger than the first coverage area, e.g a macro base station. In that case the UE can adapt its transmission power level of SRS to a transmission power suitable for communicating SRS to the macro base station, and at the same time adapt its transmission power of traffic data to a transmission power suitable for communicating traffic data to the pico base station.

According to an embodiment, the wireless network is a heterogeneous network, the first network node is a base station with a first coverage area, the second network node is a base station with a second coverage area, the second coverage area being larger than the first coverage area. By coverage area is meant the geographical area in which the base station can provide wireless connection to a user equipment communicating with the wireless network. The first network node may for example be a pico base station and the second network node may be a macro base station.

According to another embodiment, the first and the second network node may be the same network node.

Figure 20:
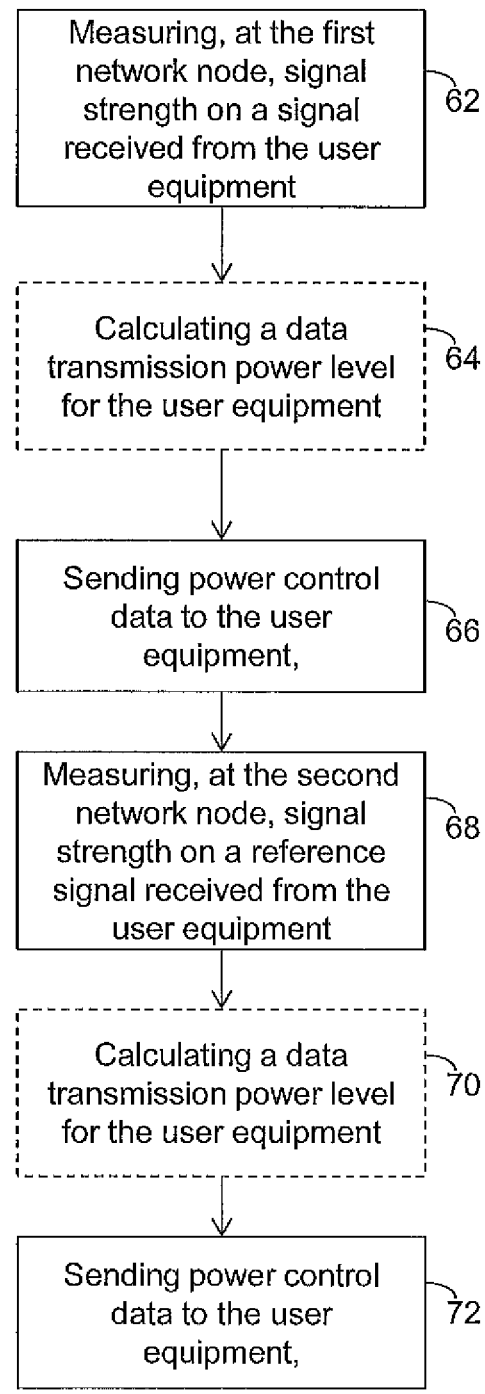
FIG. 20 is a flow chart illustrating a method in a network node system according to an embodiment.

FIG. 20 describes a method in a first and a second network node, herein called a network node system, for communicating transmission power data which are used for controlling user equipment, UE, transmission power. The method is adapted to co-operate with the corresponding methods in a UE described for controlling transmission power of the user equipment. Consequently, the method comprises receiving, at the first network node, or base station a signal from the UE, the signal may be any signal that the UE is transmitting to the first network node, such as a reference signal or a data signal. The first network node measures 62 signal strength on the signal received from the UE, and sends 66 first closed loop power control data, which are based on the measured signal strength, to the UE. The first closed loop power control data may be the actual measurement data (measured signal strength), or it may be a power control command instructing the UE to transmit data at a data transmission power level. In case of the latter, the data transmission power level for the UE is calculated 64 based on the measured signal strength. As mentioned, the sent first closed loop power control data enables the UE to control transmission power for transmission of data to the first network node. The method further comprises receiving, at the second network node, or base station, a signal from the UE, the signal may be any signal that the UE is transmitting to the second network node, such as a reference signal. The second network node measures 68 signal strength on the signal received from the UE, and sends 72 second closed loop power control data, which are based on the measured signal strength, to the UE. The second closed loop power control data may be the actual measurement data (measured signal strength), or it may be a power control command instructing the UE to transmit data at a data transmission power level. In case of the latter, the data transmission power level for the UE is calculated 70 based on the measured signal strength. As mentioned, the sent second closed loop power control data enables the UE to control transmission power for transmission of SRS to the second network node. Such a method enables a UE to adapt transmission power level for SRS and data independently of each other. The method also enables that UE data transmission power can be adapted to a level suitable for a first network node receiving the transmitted data, and that SRS transmission power can be adapted to a level for a second network node receiving the transmitted SRS.

Figure 21:
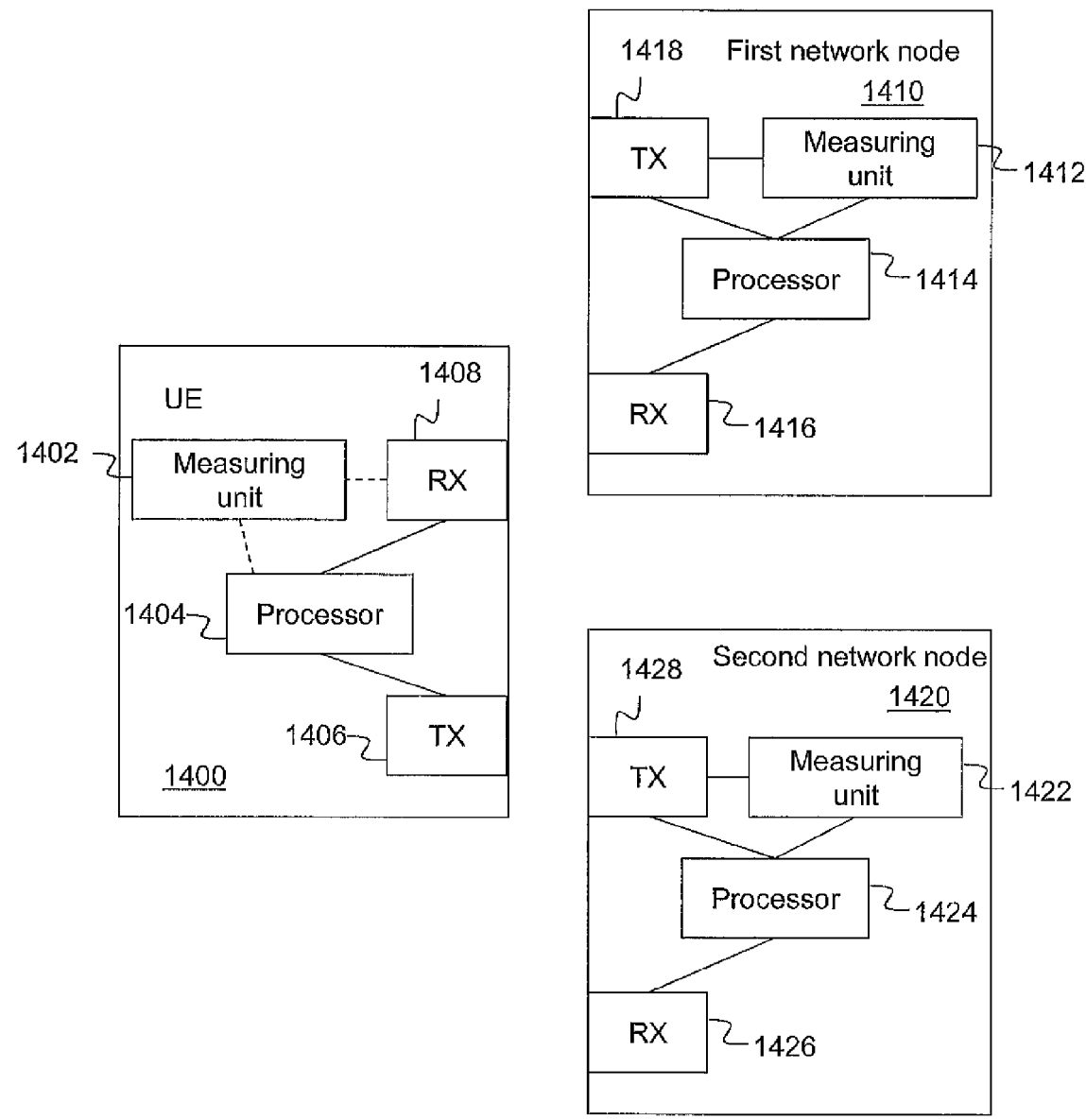
FIG. 21 is a schematic block diagram illustrating a user equipment and two network nodes according to embodiments.

FIG. 21 describes a wireless network comprising a UE 1400, a first network node 1410 and a second network node 1420 according to an embodiment. Each of the UE and the nodes may comprise a measuring unit 1402, 1412, 1422, a processor 1404, 1414, 1424, a receiver 1408, 1416, 1426 and a transmitter 1406, 1418, 1428. The arrangement in the UE 1400 may be used for controlling transmission power of the UE when the UE is connected to, or is in communication with, a wireless network, i.e. the first and the second network nodes.

According to a first alternative embodiment of an arrangement in the UE 1400 for controlling transmission power of the user equipment when the user equipment is connected to a wireless network, the receiver 1408 of the UE is arranged for receiving first closed-loop power control data from the first network node 1410 corresponding to transmission of data from the UE to the first network node, and for receiving second closed-loop power control data from the second network node 1420 corresponding to transmission of sounding reference signals, SRS from the UE to the second network node. Further, the processing unit 1404 of the UE is arranged for controlling transmission power for transmission of data to the first network node based on the received first closed-loop power control data, and for controlling transmission power for transmission of SRS to the second network node based on the received second closed-loop power control data.

According to a second alternative embodiment of an arrangement in the UE 1400 for controlling transmission power of the user equipment when the user equipment is connected to a wireless network, the receiver 1408 of the UE is arranged for receiving a first set of reference signals from the first network node 1410, and for receiving a second set of reference signals from the second network node 1420. The measuring unit 1402 of the UE is arranged for measuring a first path loss based on the received first set of signals, and for measuring a second path loss based on the received second set of signals. Further, the processing unit 1404 of the UE is arranged for controlling data transmission power for transmission of data to the first network node based on the measured first path loss, and for controlling transmission power for transmission of Sounding Reference Signals, SRS, to the second network node based on the measured second path loss.

According to a third alternative embodiment of an arrangement in the UE 1400 for controlling transmission power of the user equipment when the user equipment is connected to a wireless network, the receiver 1408 of the UE is arranged for receiving first closed-loop power control data from the first network node 1410 corresponding to transmission of data from the user equipment to the first network node, and for receiving a second set of signals from the second network node 1420. The measuring unit 1402 of the UE is arranged for measuring a path loss based on the received second set of signals. Further, the processing unit 1404 of the UE is arranged for controlling transmission power for transmission of data to the first network node based on the received first closed-loop power control data, and for controlling transmission power for transmission of Sounding Reference Signals, SRS, to the second network node based on the measured path loss.

According to a fourth alternative embodiment of an arrangement in the UE 1400 for controlling transmission power of the user equipment when the user equipment is connected to a wireless network, the receiver 1408 of the UE is arranged for receiving a first set of reference signals from the first network node 1410, and for receiving second closed-loop power control data from the second network node 1420 corresponding to transmission of sounding reference signals, SRS, from the user equipment to the second network node. The measuring unit 1402 of the UE is arranged for measuring a path loss based on the received first set of reference signals. Further, the processing unit 1404 of the UE is arranged for controlling data transmission power for transmission of data to the first network node based on the measured path loss, and for controlling transmission power for transmission of SRS to the second network node based on the received second closed-loop power control data.

According to an embodiment of the arrangement of the UE, the first and the second reference signals are signals comprising symbols having values already known by the UE 1400.

According to another embodiment, the first and/or the second reference signals are any of the following: Channel State Information Reference signals, CSI-RS, demodulation reference signals, DMRS, or Cell-specific reference signals CRS.

According to yet another embodiment, the first closed-loop power control data is power control commands or measurement data, corresponding to the user equipment's 1400 data transmission to the first network node 1410. Further, the second closed-loop power control data is power control commands or measurement data, corresponding to the user equipment's 1400 SRS transmission to the second network node 1420.

According to yet another embodiment of the arrangement of the UE, the receiver 1408 is further arranged to receive power control configuration data from the first network node 1410 and/or the second network node 1420.

The first network node 1410 and the second network node 1420 could be seen as a network node system in the way that they are two network nodes, e.g. base stations, arranged for communication with the UE 1400. The network node system is arranged for controlling transmission power of the UE 1400 when the user equipment is connected to a wireless network. For this reason, the measuring unit 1412 of the first network node is arranged for measuring signal strength on a signal received from the user equipment, and the transmitter 1418 of the first network node is arranged for sending power control data to the user equipment, called first closed-loop power control data, the first closed-loop power control data being based on the signal strength measured by the measuring unit 1412. Thereby, it is enabled for the user equipment to control data transmission power for transmission of data to the first network node, e.g. based on the quality of the transmission link between the UE and the first network node. Further, the measuring unit 1422 of the second network node 1420 is arranged for measuring signal strength on a signal received from the user equipment, and the transmitter 1428 of the second network node 1420 is arranged for sending power control data to the user equipment, called second closed-loop power control data, the second closed-loop power control data being based on the signal strength measured by the measuring unit 1422. Thereby it is enabled for the user equipment to control SRS transmission power for transmission of SRS to the second network node. Consequently, the first and the second network nodes are arranged to perform measurements corresponding to the quality of the UE's uplink transmission to the first and the second network node, respectively, i.e. to measure signal strength. These measurements are used for sending power control data to the UE which enables the UE to send data to the first network node at a transmission power suitable for reaching the first network node and to send SRS to the second network node at a transmission power suitable for reaching the second network node.

The receiver 1416 of the first network node is arranged to receive uplink transmission from the UE, which uplink transmissions may be any signal on the same link on which data is to be transmitted, and on which signal strength measurements can be performed, such as reference signals. The receiver 1416 of the first network node is also arranged for receiving data transmitted at the controlled power level. Similarly, the receiver 1426 of the second network node is arranged to receive uplink transmission from the UE, which uplink transmissions may be any signal on the same link on which SRS is to be transmitted, and on which signal strength measurements can be performed, such as reference signals.

The receiver 1426 of the second network node is also arranged for receiving SRS transmitted at the controlled power level.

Further, according to an embodiment, the processor 1414 of the first network node may be arranged for calculating a transmission power level for the user equipment for transmission of data, based on the measured signal strength. In this embodiment, the transmitter 1418 of the first network node is further arranged for sending power control commands to the user equipment for transmission of data to the first network node at the calculated power level. Also, the processor 1424 of the second network node may be arranged for calculating a transmission power level for the user equipment for transmission of SRS, based on the measured signal strength. The transmitter 1428 of the second network node is then further arranged for sending power control commands to the user equipment for transmission of SRS to the second network node at the calculated power level.

According to another embodiment, the transmitter 1418, 1428 of the first network node and/or the second network node is arranged for sending power control configuration data to the user equipment. The power control configuration data may be received from another network node or calculated by the processor.

According to an embodiment, the power control for SRS in a serving cell c for subframe (i) could be described according to the following equation:

$$P_{SRS,c}(i) = \min \begin{Bmatrix} P_{CMAX,c}(i), (P_{SRS\_OFFSET,c}(m) + 10\log_{10}(M_{SRS,c}) + \\ P_{0\_SRS,c}(j) + \alpha_{SRS,c}(j) \cdot \alpha_{SRS,c}(j) \cdot PL_c + f_c(i)) \end{Bmatrix} \quad (5)$$

wherein $P_{CMAX,c}$ is a cap of the output power; $P_{SRS\_OFFSET,c}$ is an SRS power offset, $M_{SRS,c}$ represents scheduled uplink bandwidth, $P_{0\_SRS,c}$ and $\alpha_{SRS,c}$ are respectively power reference level and fractional pathloss compensation term for open loop contribution to power control for the SRS, $PL_c$ is the measured second path loss and $f_c$ is a closed loop power correction term based on the second closed-loop power control data. Further, j is a parameter configured by the network, which may take values 0, 1 or 2 and which can affect the final value of Po or alpha. Still further, m is a parameter depending on SRS trigger type. For SRS transmission given trigger type 0 then m=0 and for SRS transmission given trigger type 1 then m=1. Compared to Equation (4) that describes power control for SRS in the LTE specification of today, the term $P_{0\_PUSCH}$ has been exchanged to $P_{0\_SRS}$ and the term a has been exchanged to $\alpha_{SRS}$. Further, $f_c$ is based on the SRS signal and not on the data signal, as in LTE specification of today. For this reason, $f_c$ may be called $f_{c\_SRS}$. The suffix SRS denotes that the terms used are specific for the SRS signal. With other words, according to the embodiment the power offset and the fractional pathloss compensation term for the open loop contribution to power control is set independently for SRS and PUSCH. Further, $P_{0\_PUSCH}$ and $\alpha_{SRS}$ may be assigned independently for each UE. Also, $P_{SRS\_OFFSET}$ may be configured in a UE specific manner.

Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

The invention claimed is:

1. A method, in a user equipment, for controlling transmission power of the user equipment when the user equipment is connected to a wireless network, the method comprising:
   receiving first closed-loop power control data, from a first network node, corresponding to transmission of data from the user equipment to the first network node;
   controlling transmission power for transmission of data to the first network node based on the received first closed-loop power control data;
   receiving second closed-loop power control data, from a second network node, corresponding to transmission of sounding reference signals (SRS) from the user equipment to the second network node, said second power control data being generated independently from said first power control data;
   controlling transmission power for transmission of SRS, to the second network node based on the received second closed-loop power control data;
   wherein the first network node and the second network node are separate network nodes.

2. The method of claim 1:
   wherein the first closed-loop power control data is power control commands or measurement data, corresponding to the user equipment's transmission to the first network node;
   wherein the second closed-loop power control data is power control commands or measurement data, corresponding to the user equipment's transmission to the second network node.

3. The method of claim 1, further comprising receiving power control configuration data from the first and/or the second network node.

4. The method of claim 1:
   wherein the wireless network is a heterogeneous network;
   wherein the first network node is a base station with a first coverage area;
   wherein the second network node is a base station with a second coverage area
   wherein the second coverage area is larger than the first coverage area.

5. The method of claim 1, wherein the transmission power for transmission of SRS for a serving cell c in a subframe (i) is set according to the following formula:

$$P_{SRS,c}(i) = \min \begin{Bmatrix} P_{CMAX,c}(i), (P_{SRS\_OFFSET,c}(m) + 10\log_{10}(M_{SRS,c}) + \\ P_{0\_SRS,c}(j) + \alpha_{SRS,c}(j) \cdot PL_c + f_c(i)) \end{Bmatrix}$$

where PCMAX,c is a cap of the output power; PSRS_OFFSET,c is an SRS power offset; MSRS,c represents scheduled uplink bandwidth; P0_SRS,c and αSRS,c are respectively power reference level and fractional pathloss compensation terms for open loop contribution to power control for the SRS; PLc is the measured second path loss; fc is a closed loop power correction term based on the second closed-loop power control data; j is a parameter configured by the wireless network; and m is a parameter depending on SRS trigger type.

6. A method, in a user equipment, for controlling transmission power of the user equipment when the user equipment is connected to a wireless network, the method comprising:

receiving a first set of reference signals from a first network node;

measuring a first path loss based on the received first set of reference signals;

receiving a second set of reference signals from a second network node;

measuring a second path loss based on the received second set of signals;

controlling data transmission power for transmission of data to the first network node based on the measured first path loss while concurrently and independently controlling transmission power for transmission of Sounding Reference Signals (SRS) to the second network node based on the measured second path loss;

wherein the first network node and the second network node are separate network nodes.

7. The method of claim 6, wherein the first and/or second set of reference signals are signals comprising symbols having values already known by the user equipment.

8. The method of claim 6, wherein the first and/or second set of reference signals are any of the following:

Channel State Information Reference signals (CSI-RS);
demodulation reference signals (DMRS);
Cell-specific reference signals CRS.

9. A method, in a user equipment, for controlling transmission power of the user equipment when the user equipment is connected to a wireless network, the method comprising:

receiving first closed-loop power control data from, a first network node, corresponding to transmission of data from the user equipment to the first network node;

receiving a second set of reference signals from a second network node;

measuring a second path loss based on the received second set of reference signals;

controlling transmission power for transmission of data to the first network node based on the received first closed-loop power control data while concurrently and independently controlling transmission power for transmission of Sounding Reference Signals (SRS) to the second network node based on the measured second path loss;

wherein the first network node and the second network node are separate network nodes.

10. A method, in a user equipment, for controlling transmission power of the user equipment when the user equipment is connected to a wireless network, the method comprising:

receiving a first set of reference signals from a first network node;

measuring a first path loss based on the received first set of reference signals;

receiving second closed-loop power control data, from a second network node, corresponding to transmission of Sounding Reference Signals (SRS) from the user equipment to the second network node;

controlling data transmission power for transmission of data to the first network node based on the measured first path loss while concurrently and independently controlling transmission power for transmission of SRS to the second network node based on the received second closed-loop power control data;

wherein the first network node and the second network node are separate network nodes.

11. A method, in a network node system, for communicating user equipment transmission power data with a user equipment when the user equipment is connected to a wireless network, the network node system comprising a first network node and a second network node, the first network node and the second network node being separate network nodes, the method comprising:

at the first network node:
measuring signal strength on a data signal received from the user equipment;
sending first closed loop power control data to the user equipment, the first closed loop power control data being based on the measured signal strength, thus enabling the user equipment to control data transmission power for transmission of data to the first network node;

at the second network node:
measuring signal strength on a reference signal received from the user equipment;
sending second closed loop power control data to the user equipment, the second closed loop power control data being independent of the first closed loop power control commands and based on the measured signal strength, thus enabling the user equipment to control Sounding Reference Signals (SRS) transmission power for transmission of SRS to the second network node.

12. The method of claim 11:

further comprising the first network node calculating a transmission power level for the user equipment for transmission of data based on the measured signal strength;

wherein sending the first closed loop power control data comprises sending power control commands to the user equipment for transmission of data to the first network node at the calculated power level further comprising the second network node calculating a transmission power level for the user equipment for transmission of SRS based on the measured signal strength;

wherein the sending second closed loop power control data comprises sending power control commands to the user equipment for transmission of SRS to the second network node at the calculated power level.

13. The method of claim 11, further comprising the first network node or the second network node sending power control configuration data to the user equipment.

14. An arrangement of a user equipment for controlling transmission power of the user equipment when the user equipment is connected to a wireless network, the arrangement comprising:

a receiver configured to:
receive first closed-loop power control data, from a first network node, corresponding to transmission of data from the user equipment to the first network node;
receive second closed-loop power control data, from a second network node, corresponding to transmission of Sounding Reference Signals (SRS) from the user equipment to the second network node;
wherein the first network node and the second network node are separate network nodes;

one or more processing circuits configured to concurrently and independently control transmission power for transmission of data to the first network node based on the received first closed-loop power control data and transmission power for transmission of Sounding Reference Signals (SRS) to the second network node based on the received second closed-loop power control data.

15. The arrangement of claim 14:
wherein the first closed-loop power control data is power control commands or measurement data, corresponding to the user equipment's data transmission to the first network node;
wherein the second closed-loop power control data is power control commands or measurement data, corresponding to the user equipment's SRS transmission to the second network node.

16. The arrangement of claim 14, wherein the receiver is further configured to receive power control configuration data from at least one of the first network node and the second network node.

17. The arrangement of claim 14, wherein the SRS transmission power for a serving cell c in a subframe (i) is set according to the following formula:

$$P_{SRS,c}(i) = \min\begin{Bmatrix} P_{CMAX,c}(i), (P_{SRS\_OFFSET,c}(m) + 10\log_{10}(M_{SRS,c}) + \\ P_{0\_SRS,c}(j) + \alpha_{SRS,c}(j) \cdot PL_c + f_c(i) \end{Bmatrix}$$

where PCMAX,c is a cap of the output power; PSRS_OFFSET,c is an SRS power offset; MSRS,c represents scheduled uplink bandwidth; P0_SRS,c and αSRS,c are respectively power offset and fractional pathloss compensation terms for open loop contribution to power control for the SRS; PLc is the measured second path loss and fc is a closed loop power correction term based on the second closed-loop power control data; j is a parameter configured by the wireless network; and m is a parameter depending on SRS trigger type.

18. An arrangement of a user equipment for controlling transmission power of the user equipment when the user equipment is connected to a wireless network, the arrangement comprising:
a receiver configured to:
receive a first set of reference signals from a first network node;
receive a second set of reference signals from a second network node;
wherein the first network node and the second network node are separate network nodes;
a measuring circuit configured to:
measure a first path loss based on the received first set of signals;
measure a second path loss based on the received second set of signals;
one or more processing circuits configured to concurrently and independently control data transmission power for transmission of data to the first network node based on the measured first path loss and transmission power for transmission of Sounding Reference Signals (SRS) to the second network node based on the measured second path loss.

19. The arrangement of claim 18, wherein the first and/or the second reference signals are signals comprising symbols having values already known by the user equipment.

20. The arrangement of claim 18, wherein the first and/or the second reference signals are any of the following:
Channel State Information Reference signals (CSI-RS);
demodulation reference signals (DMRS);
Cell-specific reference signals CRS.

21. An arrangement of a user equipment for controlling transmission power of the user equipment when the user equipment is connected to a wireless network, the arrangement comprising:
a receiver configured to:
receive first closed-loop power control data from a first network node corresponding to transmission of data from the user equipment to the first network node;
receive a second set of signals from a second network node;
wherein the first network node and the second network node are separate network nodes;
a measuring circuit configured to measure a path loss based on the received second set of signals;
one or more processing circuits configured to concurrently and independently control transmission power for transmission of data to the first network node based on the received first closed-loop power control data and transmission power for transmission of Sounding Reference Signals (SRS) to the second network node based on the measured path loss.

22. An arrangement of a user equipment for controlling transmission power of the user equipment when the user equipment is connected to a wireless network, the arrangement comprising:
a receiver configured to:
receive a first set of reference signals from a first network node;
receive second closed-loop power control data from the second network node corresponding to transmission of sounding reference signals (SRS) from the user equipment to the second network node;
wherein the first network node and the second network node are separate network nodes;
a measuring circuit configured to measure a path loss based on the received first set of reference signals;
one or more processing circuits configured to concurrently and independently control data transmission power for transmission of data to the first network node based on the measured path loss and transmission power of SRS to the second network node based on the received second closed-loop power control data.

23. A network node system for controlling transmission power of a user equipment when the user equipment is connected to a wireless network, the network node system comprising:
a first network node and a second network node, the first network node and the second network node being separate network nodes;
wherein the first network node comprises:
a first measuring circuit configured to measure signal strength on a signal received from the user equipment;
a first transmitter configured to send first closed-loop power control data to the user equipment, the first closed loop power control data being based on the signal strength measured by the measuring unit, thus enabling the user equipment to control data transmission power for transmission of data to the first network node;
wherein the second network node comprises:
a second measuring circuit configured to measure signal strength on a signal received from the user equipment;
a second transmitter configured to send second closed-loop power control data to the user equipment, the second closed-loop power control data being independent of the first closed loop power control commands and based on the signal strength measured by the measuring unit, thus enabling the user equipment to control Sounding Reference Signals (SRS) transmission power for transmission of SRS to the second network node.

24. The network node system of claim 23:
wherein the first network node further comprises one or more processing circuits configured to calculate a transmission power level for the user equipment for transmission of data based on the measured signal strength;
wherein the first transmitter is further configured to send first closed loop power control commands to the user equipment for transmission of data to the first network node at the calculated power level;
wherein the second network node further comprises one or more processing circuits configured to calculate a transmission power level for the user equipment for transmission of SRS based on the measured signal strength;
wherein the second transmitter is further configured to send second closed loop power control commands to the user equipment for transmission of SRS to the second network node at the calculated power level.

25. The network node system of claim 23, wherein at least one of the first transmitter and the second transmitter are configured to send power control configuration data to the user equipment.

* * * * *